US008301359B1

(12) United States Patent
Sagar et al.

(10) Patent No.: US 8,301,359 B1

(45) Date of Patent: Oct. 30, 2012

(54) MICROPROCESSOR CONTROLLED AUTOMATED MIXING SYSTEM, COGENERATION SYSTEM AND ADAPTIVE/PREDICTIVE CONTROL FOR USE THEREWITH

(75) Inventors: Christopher Lee Sagar, Bradenton, FL (US); Eric Michael Maskrey, Carlisle, PA (US)

(73) Assignee: HyCogen Power, LLC, Bradenton, FL (US)

( * ) Notice: Subject to any disclaimer, the term of this patent is extended or adjusted under 35 U.S.C. 154(b) by 199 days.

(21) Appl. No.: 12/727,607

(22) Filed: Mar. 19, 2010

(51) Int. Cl.
*G06G 7/70* (2006.01)

(52) U.S. Cl. .................... 701/109; 123/1 A; 123/27 GE; 123/575

(58) Field of Classification Search .......... 701/102–104, 701/109, 115; 123/1 A, 25 A, 25 C, 25 E, 123/27 A, 27 GE, 522–527, 575, 577, 578
See application file for complete search history.

(56) References Cited

U.S. PATENT DOCUMENTS 4,294,586 A 10/1981 Cox, Jr.
4,752,697 A 6/1988 Lyons et al.
4,802,100 A 1/1989 Aasen et al.
4,899,544 A 2/1990 Boyd
5,035,206 A 7/1991 Welch et al.
5,139,002 A 8/1992 Lynch et al.
5,309,729 A 5/1994 Sagar
5,367,885 A 11/1994 Sagar
5,578,090 A 11/1996 Bradin
5,592,826 A 1/1997 Sagar et al.
6,015,440 A 1/2000 Noureddini
6,016,661 A 1/2000 Sagar
6,174,501 B1 1/2001 Noureddini
6,260,378 B1 7/2001 Sagar
6,290,142 B1 9/2001 Togawa et al.
6,345,965 B1 2/2002 Sagar
6,397,790 B1 6/2002 Collier, Jr.
6,409,778 B1 6/2002 Auschra et al.
6,508,638 B2 1/2003 Sagar
6,896,789 B2 5/2005 Ross
6,988,024 B2 1/2006 Funakura et al.
7,375,210 B2 5/2008 Lim et al.
7,454,285 B2 * 11/2008 Christie et al. ................ 701/105
7,765,961 B2 * 8/2010 Rutledge ........................... 123/3
2004/0226296 A1 11/2004 Hanna et al.
2007/0039238 A1 2/2007 Matsumura
2007/0275278 A1 * 11/2007 Hwang ........................... 429/17
2008/0051592 A1 * 2/2008 McNeff et al. ................ 554/170
(Continued)

FOREIGN PATENT DOCUMENTS

WO 2008065015 A1 6/2008
(Continued)

*Primary Examiner* — John T. Kwon
*Assistant Examiner* — Johnny Hoang
(74) *Attorney, Agent, or Firm* — Jacox, Meckstroth & Jenkins

(57) ABSTRACT

A microprocessor controlled automated, multi-fuel apparatus to blend hydrogen, bio-fuel and/or natural or propane gases. This novel multi-stage apparatus first converts cooking oils into bio-fuel. The system automatically blends the bio-fuel with at least one of or both hydrogen gas, generated by a self-contained on-board hydrogen electrolyzer, and/or natural or propane gases. This blended “Hyenrich” gaseous fuel drives various processes including, but not limited to, cogeneration systems and electrical generators to produce “green” electricity by utilizing an adaptive and predictive learning algorithms to significantly reduce cost per kilowatt and lessen dependency on the over taxed utility grid, while simultaneously reducing emissions of CO, CO2 and NOx, making the method and apparatus an environmentally-friendly energy device.

38 Claims, 10 Drawing Sheets

U.S. PATENT DOCUMENTS

2008/0127550 A1 6/2008 Li et al.
2008/0221344 A1 9/2008 Gleason et al.
2008/0302104 A1* 12/2008 Hwang .......................... 60/723
2009/0025291 A1 1/2009 Ichikawa et al.
2009/0120385 A1 5/2009 Munshi et al.
2009/0320789 A1* 12/2009 Lund ............................ 123/299
2011/0046865 A1* 2/2011 Von Beck .................... 701/103

FOREIGN PATENT DOCUMENTS

WO 2009146126 A1 12/2009

* cited by examiner 12
12a
12b
MICROPROCESSOR & PLC
36
PROGRAMMED INPUTS (Fig 3)
40
ENERGY CONTROL SYSTEM & PROCESS (Fig 4)
50
SENSED INPUTS (Figs 2 & 4)
38
30
RECOVERY REFILL PROCESS ( Fig 5 )
14
CUSTOMER LOAD CENTER
BIOFUEL PROCESS (Fig 6)
24
NG-LPG
26
M
A/C POWER ALTERNATOR
18
DIESEL ENGINE, INTERNAL COMBUSTION ENGINE or TURBINE
16
H2
28
SYNCHRONIZING PARALLELING SWITCH
20
THERMAL ENERGY CHP (Fig 9)
34
UTILITY GRID
22

ENERGY CONTROL SYSTEM & PROCESS (Fig 4)
Recovery Refill System (Fig 5)
Sychronizing & Paralleling Switch (Fig 1)
Utility Grid
Customer Load
(CHP)Thermal Energy (Fig 9)

FIG 3

Initial Programmed
Start up Data
Table 1

386 12a 388 390

262 252 252 250

| Program initial system start up data | Displayed units | Inputted Value | BTU's | KW's |
|---|---|---|---|---|
| A. Desire start time | Hrs | 0600 | | |
| B. Desired daily run time cogen system | Hrs | 11.50 | | |
| C. Days of week and weekly run Schedule | Day Mon-sun | Day 1-7 | | |
| D. Alternator Output @ 100% | kW | 53.00 | 180,836 | |
| E. Percentage of Load at start up | % | 60 | 413,400 | |
| F. Vol biofuel used per hr @ 100% load | Gallons | 5.09 | 611,000 | 179 |
| G. Gas type to blend with biofuel LP/NG | Gas Type | NG | | |
| H. Vol NG used per hr @ 100% load | Cu Ft | 594.00 | 611,000 | |
| I. Vol LP used per hr @ 100% load | Gallons | 6.67 | 611,000 | |
| J. Hydrogen Electrolyzer Cal ~ 1-5% | H2 % | 2 | 12,220 | 3.58 |
| K. Set HPO fixed rate active ~ Y/N | Yes | Yes | | |
| L. CHP Thermal output ~ kW | kW | 98.58 | 336,355 | |
| M. CHP Thermal output ~ Btu | BTU | 336,355 | 336,355 | |
| N. Total Cogen kW output | kW | 152 | | |
| O. Total Cogen Btu output | BTU | 517,191 | 517,191 | 152 |
| P. Input grid kW rate | $/kW | 0.12 | 3,412 | 1 |
| Q. CHP Devices & usage of thermal energy by percentage | | | | |
| | Chiller | 75% | 252,266 | |
| | Deep fryer | 25% | 84,089 | |
| | Boiler | | | |
| | Spa | | | |
| | Pool | | | |
| | WHHS | | | |
| R. Display selected devices | | | | |
| | Chiller | | 252,266 | 73.94 |
| | Deep fryer | | 84,089 | 24.65 |
| | Boiler | | | |
| | Spa | | | |
| | Pool | | | |
| | WHHS | | | |
| S. Available used oil DAY ~ gal | Gal | 15 | | |
| T. Available used oil DAY ~ Btu | | | 1,800,000 | 528 |
| U. Available used oil WEEK ~ gal | | 105.00 | | |
| V. Available used oil WEEK ~ Btu | | | 12,600,000 | 3693 |
| W. Refills schedule per week new oil | | 2.00 | | |
| X. Max current load peak demand ~ KW | | | | |
| Y. Max current load peak demand ~ Btu | | | | |
| Z. Min set point % ~ KW | | | | |
| AA. Min set point % ~ Btu | | | | |
| BB. Hrs between filter/additive change, | 150~200hrs | 180.00 | | |
| CC. Number of Fryers and Capacity | Fryer 1 | 15 | | |
| | Fryer 2 | 20 | | |
| | Fryer 3 | 20 | | |
| | Fryer 4 | 20 | | |
| DD. Day and time scheduled drain and refill | | | | |
| | Monday | 0400 | | |
| | Thursday | 0400 | | |

ENERGY CONTROL SYSTEM & PROCESS

RECOVERY REFILL PROCESS

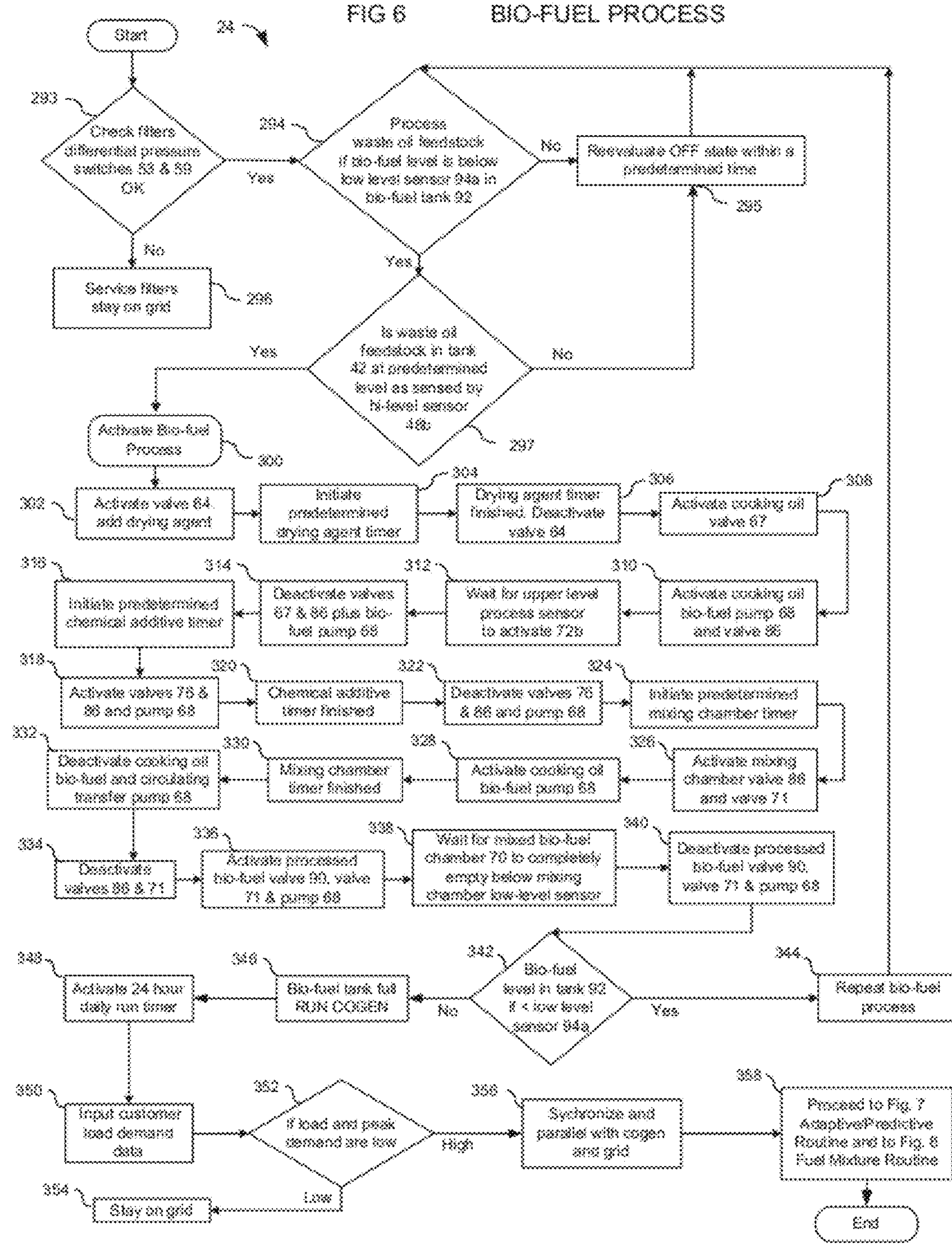
FIG 6
BIO-FUEL PROCESS
24
Start
293
Check filters differential pressure switches 53 & 59 OK
Yes
No
Service filters stay on grid
296
294
Process waste oil feedstock if bio-fuel level is below low level sensor 94a in bio-fuel tank 92
No
Reevaluate OFF state within a predetermined time
295
Yes
Is waste oil feedstock in tank 42 at predetermined level as sensed by hi-level sensor 48b
297
Yes
No
Activate Bio-fuel Process
300
302
Activate valve 64, add drying agent
Initiate predetermined drying agent timer
304
Drying agent timer finished. Deactivate valve 64
306
Activate cooking oil valve 67
308
316
Initiate predetermined chemical additive timer
314
Deactivate valves 67 & 86 plus bio-fuel pump 68
312
Wait for upper level process sensor to activate 72b
310
Activate cooking oil bio-fuel pump 68 and valve 86
318
Activate valves 76 & 86 and pump 68
320
Chemical additive timer finished
322
Deactivate valves 76 & 86 and pump 68
324
Initiate predetermined mixing chamber timer
332
Deactivate cooking oil bio-fuel and circulating transfer pump 68
330
Mixing chamber timer finished
328
Activate cooking oil bio-fuel pump 68
326
Activate mixing chamber valve 86 and valve 71
334
Deactivate valves 86 & 71
336
Activate processed bio-fuel valve 90, valve 71 & pump 68
338
Wait for mixed bio-fuel chamber 70 to completely empty below mixing chamber low-level sensor
340
Deactivate processed bio-fuel valve 90, valve 71 & pump 68
348
Activate 24 hour daily run timer
346
Bio-fuel tank full RUN COGEN
No
342
Bio-fuel level in tank 92 if < low level sensor 94a
Yes
344
Repeat bio-fuel process
350
Input customer load demand data
352
If load and peak demand are low
High
356
Sychronize and parallel with cogen and grid
358
Proceed to Fig. 7 Adaptive/Predictive Routine and to Fig. 8 Fuel Mixture Routine
354
Stay on grid
Low
End

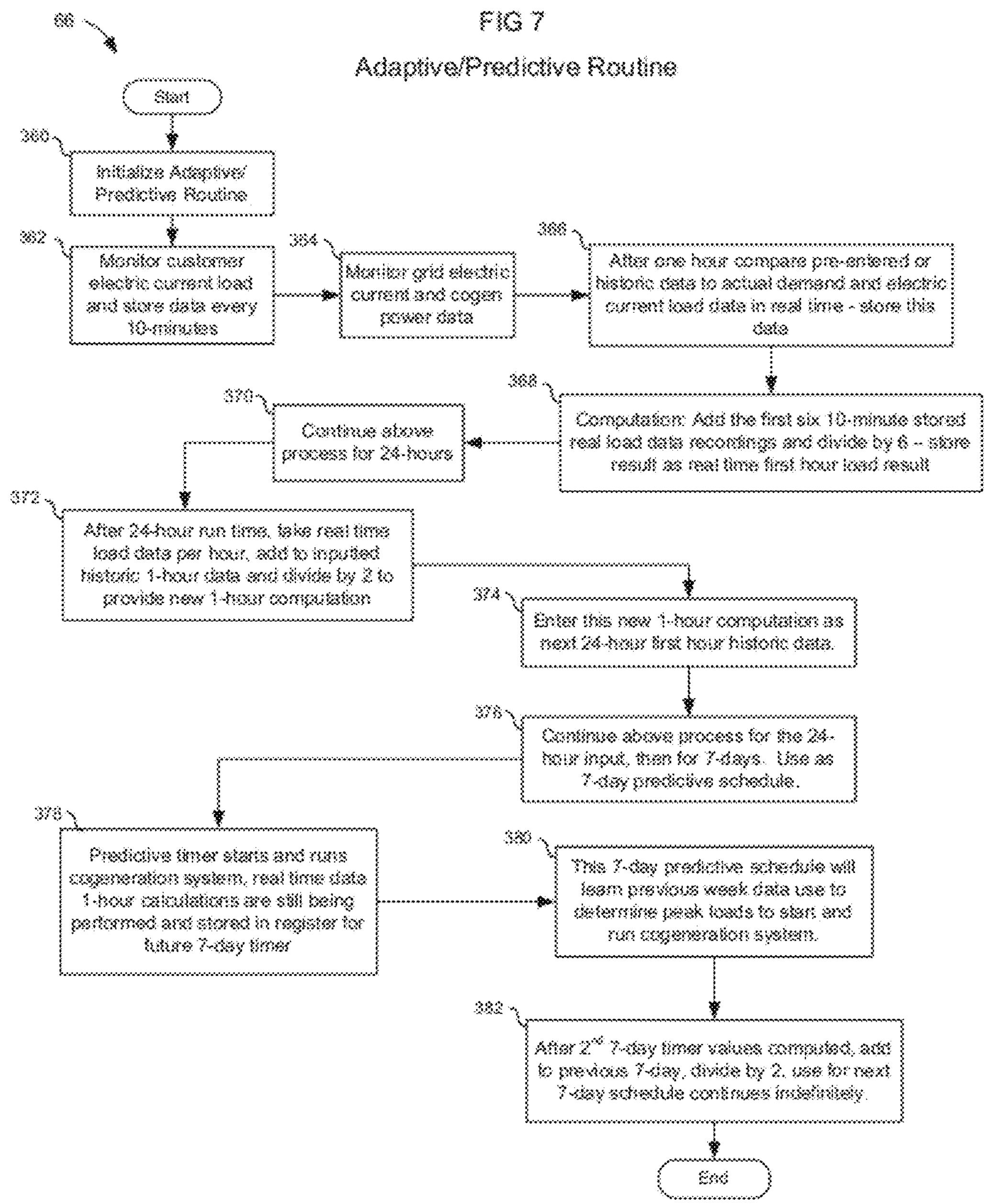
66
FIG 7
Adaptive/Predictive Routine
Start
360
Initialize Adaptive/ Predictive Routine
362
Monitor customer electric current load and store data every 10-minutes
364
Monitor grid electric current and cogen power data
366
After one hour compare pre-entered or historic data to actual demand and electric current load data in real time - store this data
368
Computation: Add the first six 10-minute stored real load data recordings and divide by 6 -- store result as real time first hour load result
370
Continue above process for 24-hours
372
After 24-hour run time, take real time load data per hour, add to inputted historic 1-hour data and divide by 2 to provide new 1-hour computation
374
Enter this new 1-hour computation as next 24-hour first hour historic data.
376
Continue above process for the 24-hour input, then for 7-days. Use as 7-day predictive schedule.
378
Predictive timer starts and runs cogeneration system, real time data 1-hour calculations are still being performed and stored in register for future 7-day timer
380
This 7-day predictive schedule will learn previous week data use to determine peak loads to start and run cogeneration system.
382
After 2nd 7-day timer values computed, add to previous 7-day, divide by 2, use for next 7-day schedule continues indefinitely.
End

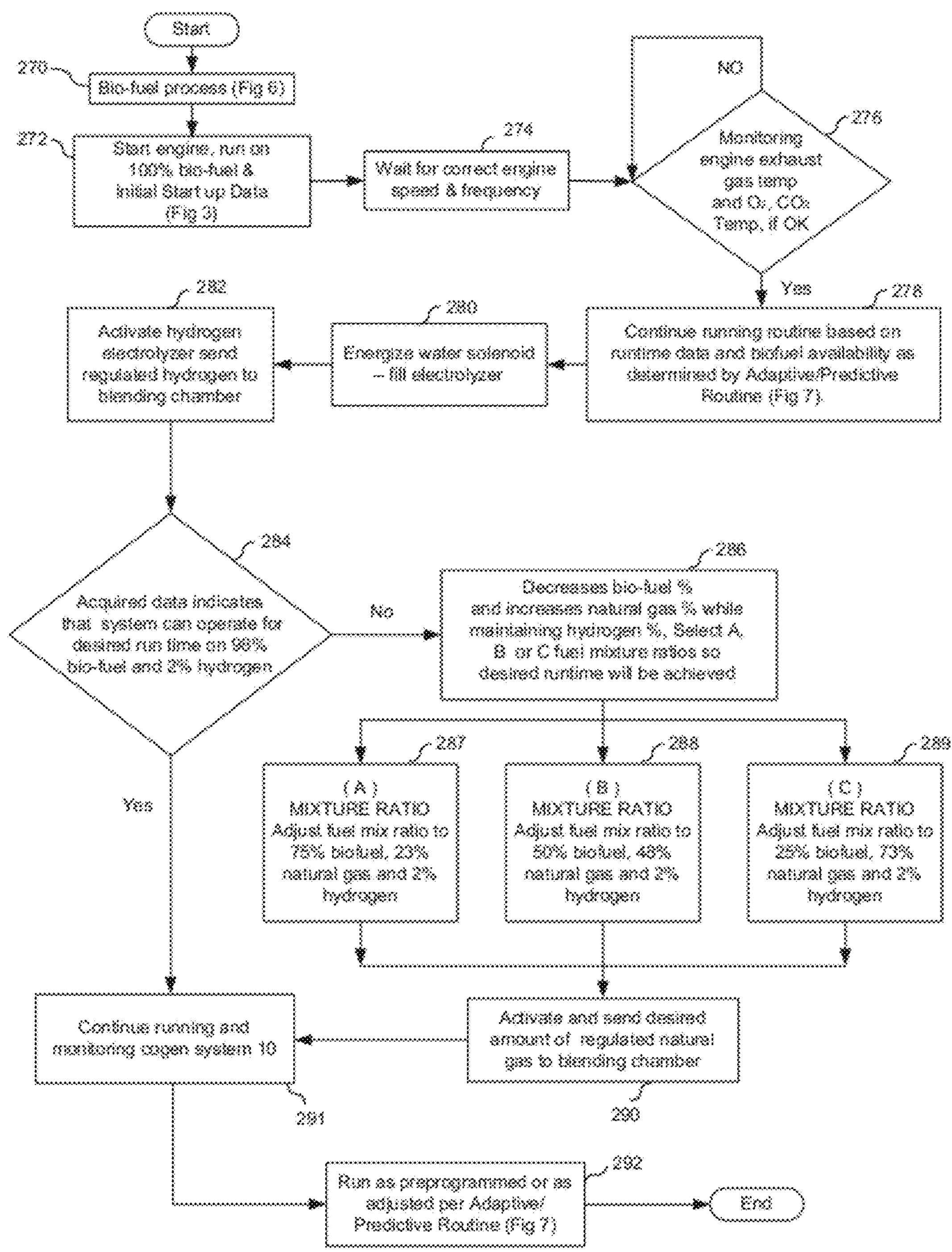
FIG 8 FUEL MIXTURE ROUTINE
Start
270
Bio-fuel process (Fig 6)
272
Start engine, run on 100% bio-fuel & Initial Start up Data (Fig 3)
274
Wait for correct engine speed & frequency
NO
276
Monitoring engine exhaust gas temp and O2, CO2 Temp, if OK
Yes
278
Continue running routine based on runtime data and biofuel availability as determined by Adaptive/Predictive Routine (Fig 7).
280
Energize water solenoid – fill electrolyzer
282
Activate hydrogen electrolyzer send regulated hydrogen to blending chamber
284
Acquired data indicates that system can operate for desired run time on 98% bio-fuel and 2% hydrogen
No
286
Decreases bio-fuel % and increases natural gas % while maintaining hydrogen %, Select A, B or C fuel mixture ratios so desired runtime will be achieved
287
( A ) MIXTURE RATIO Adjust fuel mix ratio to 75% biofuel, 23% natural gas and 2% hydrogen
288
( B ) MIXTURE RATIO Adjust fuel mix ratio to 50% biofuel, 48% natural gas and 2% hydrogen
289
( C ) MIXTURE RATIO Adjust fuel mix ratio to 25% biofuel, 73% natural gas and 2% hydrogen
Yes
Continue running and monitoring cogen system 10
291
Activate and send desired amount of regulated natural gas to blending chamber
290
292
Run as preprogrammed or as adjusted per Adaptive/ Predictive Routine (Fig 7)
End FIG 9 CHP PROCESSES
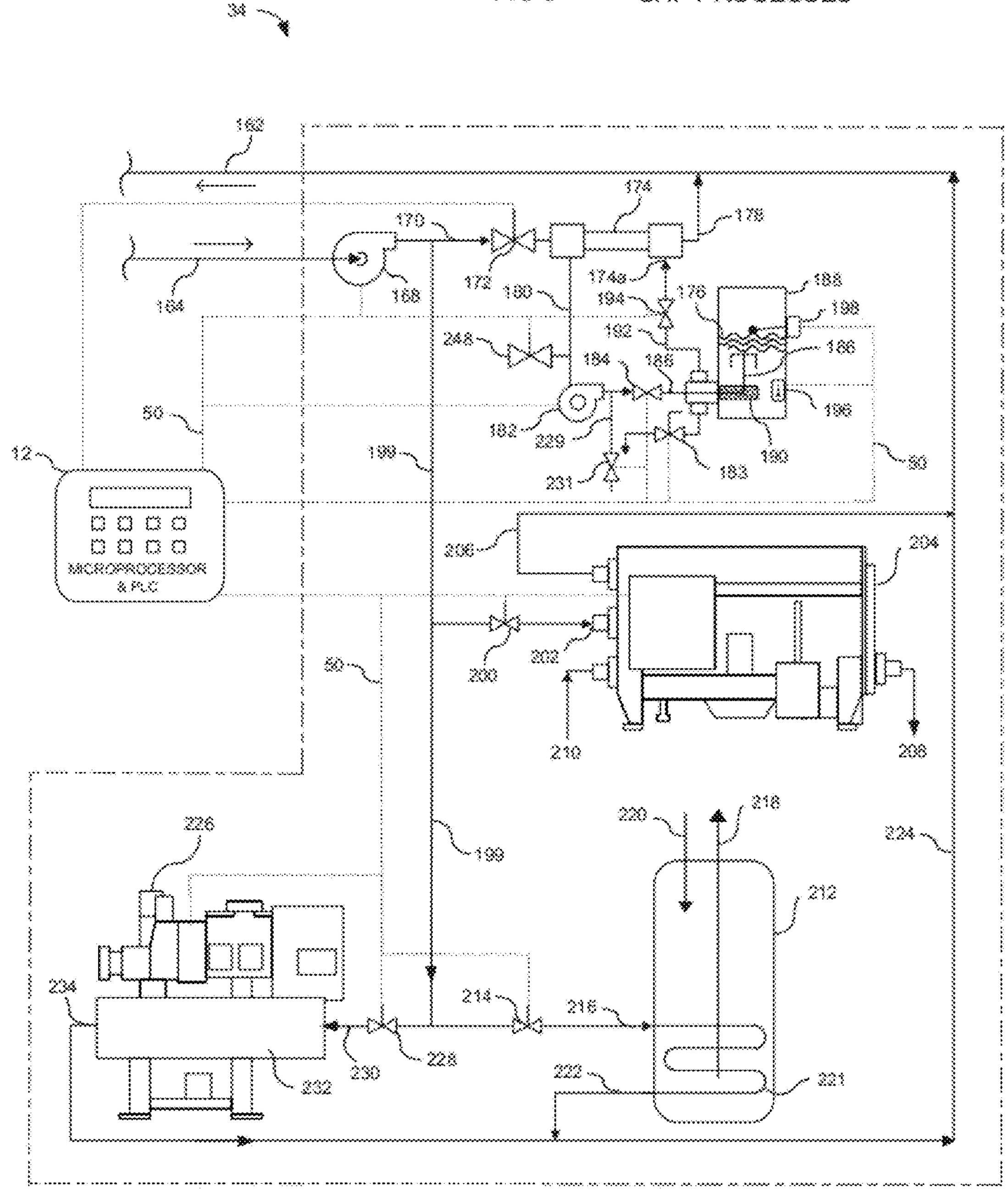

30

MULTIPLE DEEP FRYER PROCESS
162
164
166
170
172
174
174a
178
180
199
248
246
12
242
244
50
182
184
186
188
198
176
192
194
196
190
229
231
233
235
48b
48a
42
183
194a
176a
188a
198a
192a
186a
184a
196a
190a
183a
229
192
194c
176c
188c
198c
192c
186c
184c
196c
190c
183c
194b
176b
188b
198b
192b
186b
184b
196b
190b
183b

MICROPROCESSOR CONTROLLED AUTOMATED MIXING SYSTEM, COGENERATION SYSTEM AND ADAPTIVE/PREDICTIVE CONTROL FOR USE THEREWITH

BACKGROUND OF THE INVENTION

1. Field of the Invention

This invention relates to improvements of multiple fuel blending. More particularly, it relates to an apparatus and method for automatically using and converting various waste cooking oils, including but not limited to, variations of vegetable, peanut and pressed oils, into usable bio-fuel while simultaneously and automatically blending this fuel with natural gas or propane and hydrogen in a predetermined ratio that is adapted and predicted based on historical and actual use data.

2. Description of the Related Art

For many years, industry has been interested, on the one hand, in alternative energy sources that are not based on fossil deposits, and on the other hand, in so-called "renewable raw materials." The latter include in particular plant oils, or in other words, fatty acid esters, usually triglycerides, which in general can be classified as bio-degradable and environmentally harmless.

Various environmental legislation, structural changes in agriculture and the general ecological trend, have facilitated the growth and use of bio-fuels as renewable raw materials in place of existing fuels such as conventional diesel fuel.

More recently, there has been a very strong focus on a user's use of fuel resources and their ultimate "carbon footprint," which generally describes the environmental impact of carbon emissions, measured in units of carbon dioxide. The carbon footprint measures the amount of carbon dioxide produced by a person, organization or location at a given time. It is generally environmentally and politically friendly to reduce one's carbon footprint.

Various systems and processes were developed in the past to process bio-diesel fuels. It was also not uncommon to blend such fuels with natural gas in order to improve the fuel efficiencies and lower the NOx, CO and CO2 emissions as well as facilitate reducing the carbon footprint associated with the location.

Biodiesel fuel production is a well-known art that can be accomplished in numerous ways. Typically, it involves manual steps of mixing chemicals such as lye and methanol, then heating the waste oil and removing any glycerin by-product. This process can be done with multiple procedures in multiple combinations to produce various types of biodiesel fuels. U.S. Pat. Nos. 6,015,440; 6,174,501 and 6,409,778 are examples of this type of production and are incorporated herein by reference and made a part hereof.

Hydrogen was sometimes mixed with natural gas and used as a fuel. Generating hydrogen by electrolysis of water is another known art whereby water is introduced into an electrolyzer cell in which an electric current separates the water molecules into a hydrogen and oxygen gas mixture called hydroxyl. This gas is further separated in a bubbler, where pure hydrogen is obtained for various uses. An additional known technique for accelerating the electrolysis process is adding a catalyst, such as potassium hydroxide KOH to the supply of distilled or domestic tap water. U.S. Pat. Nos. 6,896,789; 5,139,002 and U.S. Publication No. 2009/0025291 are examples of several hydrolysis techniques and are incorporated herein by reference and made a part hereof.

Furthermore, other prior inventions have utilized the blending of natural gas with diesel fuels to improve fuel efficiencies and to lower NOx, CO and CO2 emissions, as well as to provide flexibility of multi-fuel operation for the compression ignition engine as described, for example, in U.S. Pat. No. 5,035,206 and U.S. Publication No. 2009/0120385, all of which are incorporated herein by reference and made a part hereof.

Another known art is cogeneration typically known as Combined Heat and Power (CHP) which utilizes the waste heat from an engine water jacket and exhaust gas. The waste heat is converted to useful energy to improve the overall efficiency of combustion burn process to thoroughly consume the entire BTU energy content of various fuels. It is also known as the art of utilizing waste thermal heat for various ancillary processes as described, for example, in U.S. Pat. Nos. 4,752,697; 4,802,100; 6,988,024 and 6,290,142 and WO2009/0146126, all of which are incorporated herein by reference and made a part hereof.

Because gaseous fuels, such as natural gas, propane, hydrogen and blends thereof, are cleaner burning fuels compared to liquid fuels, such as diesel, recent attention has been directed to developing engines that can burn such fuels while matching the power and performance that engine operators are accustomed to expecting from diesel engines. Recently, research has been directed towards blending natural gas and hydrogen for use in a homogenous charge, spark-ignition engines.

Engines that are capable of injecting a gaseous fuel directly into the combustion chamber of a high compression internal combustion engine are being developed. Engines fueled with natural gas that use this approach can substantially match the power, performance and efficiency characteristics of a conventional diesel engine, but with lower emissions of NOx, unburned hydrocarbons and particulate material (PM). NOx are key components in the formation of photochemical smog, as well as believed to be a contributor to acid rain. PM emissions, among other detrimental health effects, have been linked to increased cardiovascular mortality rates and impaired lung development in children. However, with direct injection engines that are fueled with natural gas, it has been found that there is a trade-off between NOx emissions and emissions of unburned hydrocarbons and PM. Environmental regulatory bodies in North America and around the world have legislated substantial reductions in NOx and PM emissions from internal combustion engines.

What is needed, therefore, is a system and method that advances and improves upon the current technology and that not only advances the control and mixture of fuels used for combustion in an engine, but also facilitates providing a system and method that efficiently and effectively uses waste heat, reduces emissions and provides a cogeneration electrical system having automatic refilling and control.

SUMMARY OF THE INVENTION

In one aspect, one embodiment provides a system and method for automatically controlling a fuel mixture used in a combustion or turbine engine.

In another aspect, another embodiment provides a system and method having adaptive and predictive capabilities to improve the usage of bio-fuel in combination with at least one of hydrogen and/or natural gas or propane gas.

Still another object of one embodiment is to provide a cogeneration system for generating electricity in parallel with a utility grid.

Still another object of another embodiment is to provide an automatic oil refilling system for transferring waste oil to the system and refilling, for example, a deep fryer in a fast food restaurant.

In another embodiment, an object is to provide a system and method for utilizing waste heat from the engine in various ancillary processes, such as to heat an apparatus, such as a deep fryer, to heat a boiler, a mechanical alternator, absorption chiller, hot tub, pool, or the like.

Still another object of an embodiment is to provide a system and method for controlling the ratios of fuels in the fuel mixture ratio in response to adaptive and predictive data associated with a location.

Yet another object of an embodiment is to provide a system and method for generating adaptive and predictive data for use in controlling the system and the fuel mixture that is fed to the internal combustion engine or turbine engine.

Another object of one embodiment is to provide a system and method for automatically extracting, cleansing, purifying and converting bio-fuel on-site and blending it with natural gas, propane and hydrogen to produce a high-efficiency gaseous fuel for combustion or spark ignited-type engines or turbine engines that result in increased fuel efficiency with a drastic decrease in harmful emissions. Simultaneously, a microprocessor programmed with control algorithms determines the most efficient use of the fuels and processes. This and other embodiments can result in a decreased reliance on the public utility grid.

The apparatus and method have means for predicting user needs and adapting the mixture in response to various inputs and factors, such as availability of bio-fuel. The resulting renewable fuel is highly efficient and drastically reduces emissions of NOx, CO and CO2. Additional to this super fuel is the ability, via microprocessors or PLCs with various algorithms, to Adapt, Predict and Learn (APL) the most energy efficient usages of said fuels with compression ignition or spark ignited engines or turbine engines in various applications, including but not limited to, cogeneration or combined heat and power (CHP) applications working in parallel with the utility grid while reducing the reliance on outdated and heavily taxed utility grid.

In one aspect, one embodiment comprises an automated mixing system for providing a fuel mixture for use by an engine that drives a generator or alternator, comprising a gas supply for providing at least one of natural gas, propane or hydrogen, a bio-fuel supply for providing a bio-fuel, a plurality of valves for controlling a mixture and delivery of the gas supply and the bio-fuel in a predetermined fuel ratio to the engine and a processor coupled to the plurality of valves and causing the plurality of valves to generate the fuel mixture of the bio-fuel and the at least one of natural gas, propane or hydrogen from the bio-fuel supply and the gas supply, respectively, in a predetermined fuel ratio that is adapted in response to an amount of available bio-fuel.

In another aspect, another embodiment comprises a cogeneration system for use in lieu with or in combination with a power grid for providing power to a location, the cogeneration system comprising a cogenerator comprising an engine coupled to a generator for generating electricity, a natural gas or propane supply for providing natural gas or propane, a hydrogen supply for providing hydrogen, a bio-fuel supply for providing bio-fuel adapted to be combusted in the engine, a plurality of valves for controlling a mixture and delivery of natural gas or propane, hydrogen and bio-fuel in a predetermined fuel ratio to the engine and at least one sensor for sensing at least one condition relating to the engine or its use, a power grid sensor for sensing power provided by the power grid at the location and a processor coupled to the at least one sensor, the plurality of valves and the power grid sensor, the processor controlling the plurality of valves to generate a fuel mixture in a predetermined fuel ratio in response to a demand for power at the location, a cogeneration run time and an amount of available bio-fuel from the bio-fuel supply in order to run the engine to generate electricity for use at the location.

In yet another aspect, another embodiment comprises a method for reducing emissions associated with use of electricity at a location that receives electricity from a power grid, the method comprising the steps of supplying natural gas or propane, hydrogen and bio-fuel to an internal combustion engine or turbine engine in a predetermined fuel ratio; the internal combustion engine or turbine engine being coupled to a generator for generating electricity at the location, sensing at least one condition relating to the internal combustion engine or turbine engine or its use and causing a plurality of valves to be actuated to provide the natural gas or propane, hydrogen and bio-fuel to the internal combustion engine or turbine engine in the predetermined fuel ratio and in response to the at least one condition in order to facilitate reducing carbon footprint of the location.

In yet another aspect, another embodiment comprises a method for heating bio-fuel via a heat exchanger process, the method comprising the steps of heating the bio-fuel using a heat exchange, supplying natural gas or propane, hydrogen and bio-fuel to an internal combustion engine or turbine engine in a predetermined fuel ratio, the internal combustion engine or turbine engine being coupled to a generator for generating electricity at the location, sensing at least one condition relating to the internal combustion engine or turbine engine or its use and causing a plurality of valves to be actuated to provide the natural gas or propane, hydrogen and bio-fuel to the internal combustion engine or turbine engine in the predetermined fuel ratio and in response to the at least one condition.

In yet another aspect, another embodiment comprises a method for heating cooking oil via a heat exchanger process, the method comprising the steps of supplying natural gas or propane, hydrogen and bio-fuel to an internal combustion engine or turbine engine in a predetermined fuel ratio, the internal combustion engine or turbine engine being coupled to a generator for generating electricity at the location, sensing at least one condition relating to the internal combustion engine or turbine engine or its use, causing a plurality of valves to be actuated to provide the natural gas or propane, hydrogen and bio-fuel to the internal combustion engine or turbine engine in the predetermined fuel ratio and in response to the at least one condition and using heat generated by the internal combustion engine or turbine engine to heat cooking oil at the location.

In yet another aspect, another embodiment comprises a method for automatically removing and recharging cooking oil via a heat exchanger process and to reduce its viscosity the method comprising the steps of supplying natural gas or propane, hydrogen and bio-fuel to an internal combustion engine or turbine engine in a predetermined fuel ratio, the internal combustion engine or turbine engine being coupled to a generator for generating electricity at the location, sensing at least one condition relating to the internal combustion engine or turbine engine or its use, causing a plurality of valves to be actuated to provide the natural gas or propane, hydrogen and bio-fuel to the internal combustion engine or turbine engine in the predetermined fuel ratio and in response to the at least one condition, removing used oil from at least one deep fryer at the location and using it to provide the bio-fuel and recharging the at least one deep fryer with replacement oil.

In yet another aspect, another embodiment comprises a method for generating cooling in an absorption cooling process via a heat exchanger process, the method comprising the steps of supplying natural gas or propane, hydrogen and bio-fuel to an internal combustion engine or turbine engine in a predetermined fuel ratio, the internal combustion engine or turbine engine being coupled to a generator for generating electricity at the location, sensing at least one condition relating to the internal combustion engine or turbine engine or its use, causing a plurality of valves to be actuated to provide the natural gas or propane, hydrogen and bio-fuel to the internal combustion engine or turbine engine in the predetermined fuel ratio and in response to the at least one condition and using waste heat from the internal combustion engine or turbine engine in the at least one combined heat and power system.

In yet another aspect, another embodiment comprises a system to heat an auxiliary boiler via heat exchange, the system comprising the steps of supplying natural gas or propane, hydrogen and bio-fuel to an internal combustion engine or turbine engine in a predetermined fuel ratio, the internal combustion engine or turbine engine being coupled to a generator for generating electricity at the location, sensing at least one condition relating to the internal combustion engine or turbine engine or its use, causing a plurality of valves to be actuated to provide the natural gas or propane, hydrogen and bio-fuel to the internal combustion engine or turbine engine in the predetermined fuel ratio and in response to the at least one condition and using heat from the internal combustion engine or turbine engine to heat the auxiliary boiler.

In yet another aspect, another embodiment comprises a system to generate electricity via an auxiliary waste heat exchange, the system comprising supplying natural gas or propane, hydrogen and bio-fuel to an internal combustion engine or turbine engine in a predetermined fuel ratio, the internal combustion engine or turbine engine being coupled to a generator for generating electricity at the location, sensing at least one condition relating to the internal combustion engine or turbine engine or its use, causing a plurality of valves to be actuated to provide the natural gas or propane, hydrogen and bio-fuel to the internal combustion engine or turbine engine in the predetermined fuel ratio and in response to the at least one condition and using heat from the internal combustion engine or turbine engine to drive the auxiliary waste heat generator to generate electricity at the location.

In yet another aspect, another embodiment comprises a system for automated removal and refilling of oil, the system comprising at least one tank for storing the oil for use at a location, a supply of unused oil, a used oil tank for receiving used oil, at least one pump coupled to the tank, a plurality of valves for controlling fluid flow among the supply of unused oil, the at least one tank and the used oil tank and a processor coupled to the at least one pump and the plurality of valves, the processor causing the fluid in the at least one tank to be transferred to a used oil tank and thereafter causing the unused fluid from the supply of unused oil to be transferred to the at least one tank.

In yet another aspect, another embodiment comprises a method for cogenerating electricity at a location, the method comprising the steps of inputting energy control data into a processor, the data comprising at least a cogeneration run time and an amount of available bio-fuel data, generating a fuel mixture of bio-fuel with at least one of hydrogen, natural gas or propane in a predetermined fuel ratio in response to the cogeneration run time and the amount of available bio-fuel data and running a cogenerator to generate electricity using the fuel mixture using the predetermined fuel ratio.

In yet another aspect, another embodiment comprises an adaptive/predictive control for controlling an operation of a cogeneration system at a facility, the adaptive/predictive control comprising a processor coupled to the cogeneration system for controlling the operation of the system, an adaptive/predictive routine programmed into the processor, an input keyboard coupled to the processor for inputting data into the processor, the data including at least an initial run time for running the cogeneration system and an amount of bio-fuel available for use by the cogeneration system, the processor running the adaptive/predictive routine to monitor and track energy consumption at the facility and causing the cogeneration system to run at least during peak demand periods.

In yet another aspect, another embodiment comprises an adaptive/predictive control method for controlling an operation of a cogeneration system at a facility, the adaptive/predictive control method comprising the steps of providing a processor having an adaptive/predictive routine, the processor being coupled to the cogeneration system for controlling the operation of the system, inputting control data into the processor, the control data including at least an initial run time for running the cogeneration system and an amount of bio-fuel available for use by the cogeneration system and monitoring and tracking energy consumption at the facility and the processor causing the cogeneration system to run at least during peak demand periods.

The above mentioned aspects and the embodiments shown and described herein could be used alone or together and/or in combination with one or more of the features covered by one or more of the claims set forth herein, including but not limited to one or more of the following features or steps:

- generating an energy consumption signal in response to an amount of energy demanded at a location;
- adapting the predetermined fuel ratio in response thereto;
- generating an adaptive routine for tracking historical data regarding energy consumption at a location and adapting the predetermined fuel ratio in response thereto;
- determining at least one of a cumulative hour-by-hour average energy consumption or a cumulative day-by-day average energy consumption;
- predicting energy consumption at the location in response to the at least one of a cumulative hour-by-hour average energy consumption or the cumulative day-by-day average energy consumption and adapting the predetermined fuel ratio in response thereto;
- adjusting the predetermined fuel ratio in response to an amount of bio-fuel available from the bio-fuel supply;
- tracking historical data regarding energy consumption at the location and adapting the predetermined fuel ratio in response thereto;
- decreasing an amount of bio-fuel in the predetermined fuel ratio if a demand for power at a location is low based upon historical data of power usage at the location;
- adjusting the predetermined fuel ratio in a response to a cost of power from a power grid;
- using cooking oil as the bio-fuel;
- the bio-fuel comprising an additive;
- using a predetermined fuel ratio having approximately at least 25% bio-fuel, with a majority of a remaining predetermined fuel ratio being natural gas or propane and a minority of the remaining predetermined fuel ratio being hydrogen when bio-fuel from the bio-fuel supply is available and a demand for power at a location is above a predetermined demand;

wherein the predetermined demand is a high demand as determined by the processor based upon historical data;

using a predetermined fuel ratio is approximately at least 75% bio-fuel, with a majority of a remaining portion of the predetermined fuel ratio being natural gas or propane and a minority of the remaining portion of the predetermined fuel ratio being hydrogen;

using a predetermined fuel ratio is approximately at least 73% natural gas or propane, with a majority of a remaining predetermined fuel ratio being bio-fuel and a minority of the remaining predetermined fuel ratio being hydrogen when either bio-fuel from the bio-fuel supply is below a predetermined bio-fuel supply amount or a demand for power at a location is below a predetermined demand;

wherein the predetermined demand is a low demand as determined by the processor based upon historical data;

providing bio-fuel, natural gas or propane and hydrogen in the predetermined fuel ratio to the engine to cause the generator to generate electricity at the location when a load peak demand at the location is high;

controlling an amount of power used from the power grid and an amount of electricity provided by the generator when the load peak demand is high;

using a hydrogen electrolyzer for generating the hydrogen from water to provide the hydrogen at the location;

wherein the at least one condition is an amount of emissions of the engine or a temperature of the engine;

wherein the at least one condition is an amount of power available from a power grid and an amount of bio-fuel in the bio-fuel supply and available for consumption by the engine;

determining at least one of a cumulative hour-by-hour average energy consumption or a cumulative day-by-day average energy consumption;

sensing an emission of at least one of CO2, CO or NOx gases generated by the engine and generating a sensed emission signal in response thereto;

adjusting the predetermined fuel ratio in response to the sensed emission signal;

adjusting the predetermined fuel ratio in a response to a quantity of the bio-fuel supply available;

maintaining an adaptive routine for tracking historical data regarding energy consumption at the location;

increasing an amount of bio-fuel in the predetermined fuel ratio in response to a cost of power to be demanded from a power grid using the historical data;

wherein the predetermined fuel ratio is approximately at least 73% natural gas or propane, with a majority of a remaining portion of the predetermined fuel ratio being bio-fuel and a minority of the remaining portion of the predetermined fuel ratio being hydrogen;

wherein the processor causes the oil in the at least one tank to be transferred to the used oil tank after a predetermined time;

wherein the at least one tank comprises at least one deep fryer for deep frying food;

wherein the at least one tank comprises a plurality of tanks;

wherein the used oil tank provides a supply for a bio-fuel electrical cogeneration system;

wherein the at least one tank, the used oil tank and the supply of unused oil are each located at the location;

wherein the location is a restaurant facility;

a cogeneration system having at least one engine; and wherein any unused oil being heated by waste heat from the engine after it is received in the at least one tank.

These and other objects and advantages of the invention will be apparent from the following description, the accompanying drawings and the appended claims.

BRIEF DESCRIPTION OF THE DRAWINGS

FIG. 3 is a schematic view of a display of the microprocessor/controller showing various data that is input into the microprocessor/controller at start up;

FIG. 6 is a schematic of a bio-fuel refining process routine;

FIG. 7 is a schematic of an adaptive/predictive routine in accordance with one embodiment;

FIG. 8 is a schematic of a fuel mixture and start routine used by the microprocessor/controller;

FIG. 9 is a schematic showing details of an optional combined heat and power ("CHP") process and system used in one embodiment.

DETAILED DESCRIPTION OF THE PREFERRED EMBODIMENTS

Referring now to FIGS. 1-10, an automated microprocessor controlled multi-fuel mixing cogeneration system 10 is shown. In the embodiment being described, the multi-fuel mixing cogeneration system 10 blends hydrogen, bio-fuel, biodiesel/diesel fuel and/or natural gas or propane in a predetermined ratio to provide a highly efficient cogeneration system for efficiently using various fuel sources in a manner that minimizes cost, facilitates reducing emissions of NOx, CO and CO2 emissions, and decreases the dependence on a conventional utility power grid. The bio-fuel mixture may or may not comprise an additive, such as a thinning combustion additive of the type described later herein. In the illustration being described, the cogeneration system 10 and methods described herein provide automated delivery of the various gases and/or fuel, automated blending, monitoring and controlling of the mixtures of such fuels for a fuel to be used by the cogeneration system 10. The system 10 facilitates reducing the use of or need for petroleum-based fuels, such as diesel fuel, while reducing carbon emissions and also facilitates reducing dependency on the public power grid.

The cogeneration system 10 further comprises means for adapting to, predicting and learning a user's actual demand and use of the various fuels as delivered and consumed by an engine (described later herein) of the type that is used in various applications, including but not limited to, cogeneration of electricity, or combined heat and power applications ("CHP"). The system 10 permits working in conjunction with or in parallel to the conventional utility grid while reducing a consumer's reliance on the utility grid as a source of electricity.

Figure 1:
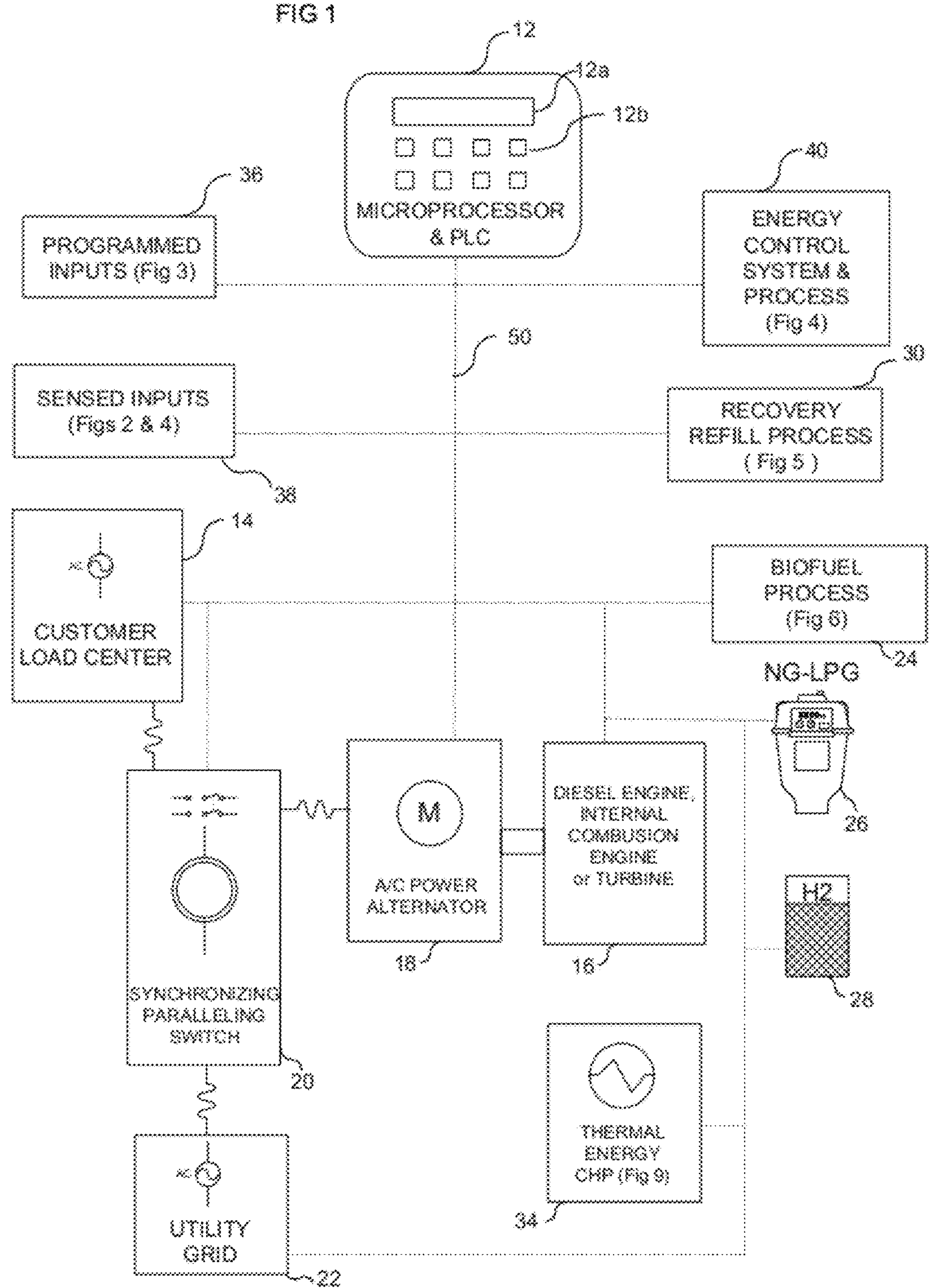
FIG. 1 is a schematic of a system and method in accordance with one embodiment of the invention.

Referring now to FIG. 1, a general overview of one embodiment of the invention is shown wherein the system 10 comprises a processor or microprocessor/controller 12 that is programmable and controls the operation of the system 10 in order to provide, among other things, cogenerated electricity to a user or customer load location 14. In the illustration being described, the system 10 comprises an engine 16 that drives an alternator/generator 18 that is coupled to a synchronizing parallel switch or switch box 20 as shown. Although the engine 16 is shown as a diesel engine, it should be understood that the engine 16 could be any type of turbine or internal combustion engine, such as a gasoline engine, diesel engine, natural gas engine, turbine engine, micro turbine, or other gas combustion engine. Note that the synchronizing parallel switch 20 and engine 16 are coupled to and under the control of the microprocessor/controller 12, which synchronizes the delivery of electricity provided by the alternator/generator 18 to the user load location 14 with the electricity provided by a conventional utility grid or power grid 22. The synchronizing parallel switch 20 synchronizes the electricity provided by the system 10 and the grid 22 controls the electricity that is delivered to the customer load location 14 from the utility grid 22 and the A/C power alternator/generator 18. The microprocessor/controller 12 is coupled to the various components shown in FIG. 1, including the engine 16, the A/C power alternator/generator 18 and the synchronizing parallel switch 20, with the connections being indicated by the dotted lines for ease of illustration.

The system 10 further comprises a bio-fuel generation system 24, natural gas or propane gas supply 26 and a hydrogen gas supply 28, all of which will be described later herein. The microprocessor/controller 12 controls the production and/or supply of these fuels in a predetermined mixture or ratio to the engine 16 in a manner that facilitates reducing the user's cost per kilowatt hour and lessens the user's dependency on the utility grid 22 in the manner described herein.

The system 10 further comprises an optional automated refill system or process 30 which will be described later herein relative to FIG. 5. In general, the automated refill system 30 comprises means and apparatus for automatically refilling and supplying used bio-fuel, such as used cooking oil (including, but not limited to, used vegetable, peanut, olive or other processed oils) to the bio-fuel generation system 24, described later herein relative to FIG. 2. In one example, the automatic refill system 30 transfers used cooking oil from a deep fryer, shown and describe later, and automatically refills or replaces the used cooking oil with new cooking oil after the used oil has been transferred to the system 10.

In general, the refill system or process provides means for utilizing thermal energy generated by the cogeneration system 10 to heat an auxiliary fluid, such as a cooking oil, thereby utilizing the waste heat from the system 10 to heat the cooking oil and to increase the overall energy efficiency of the system 10. Thus, the system 10 comprises a system and means 34 (FIG. 1) for not only cogeneration of electricity, but also a thermal energy process means and system 34 that utilizes waste heat generated by the engine 16 in the manner described herein relative to FIG. 9.

It should be understood that the microprocessor/controller 12 uses various programming inputs 36 (FIG. 3) and sensed inputs 38 (FIGS. 2 and 4), along with an energy control system and process 40 (FIG. 4) for efficiently and effectively controlling the system 10 to maximize cogeneration of electricity, maximize use of heat generated by the engine 16, adaptively and predicatively learn the electric utilization patterns of a user load location 14 in order to efficiently control the user or customer's use of electricity in order to minimize costs realized by the customer and, if desired, minimize the carbon footprint generated by the customer by minimizing CO2 and NOx emissions.

As described later herein relative to FIG. 7, the system 10 comprises an adaptive and predictive routine stored in memory (not shown) and utilized by the microprocessor/controller 12 to control the operation of system 10, including the mixing of a plurality of the bio-fuel, hydrogen, natural gas or propane. The microprocessor/controller 12 substantially constantly observes and determines the most efficient operation of the system 10 to provide the most efficient energy output utilizing the system 10.

Figure 2:
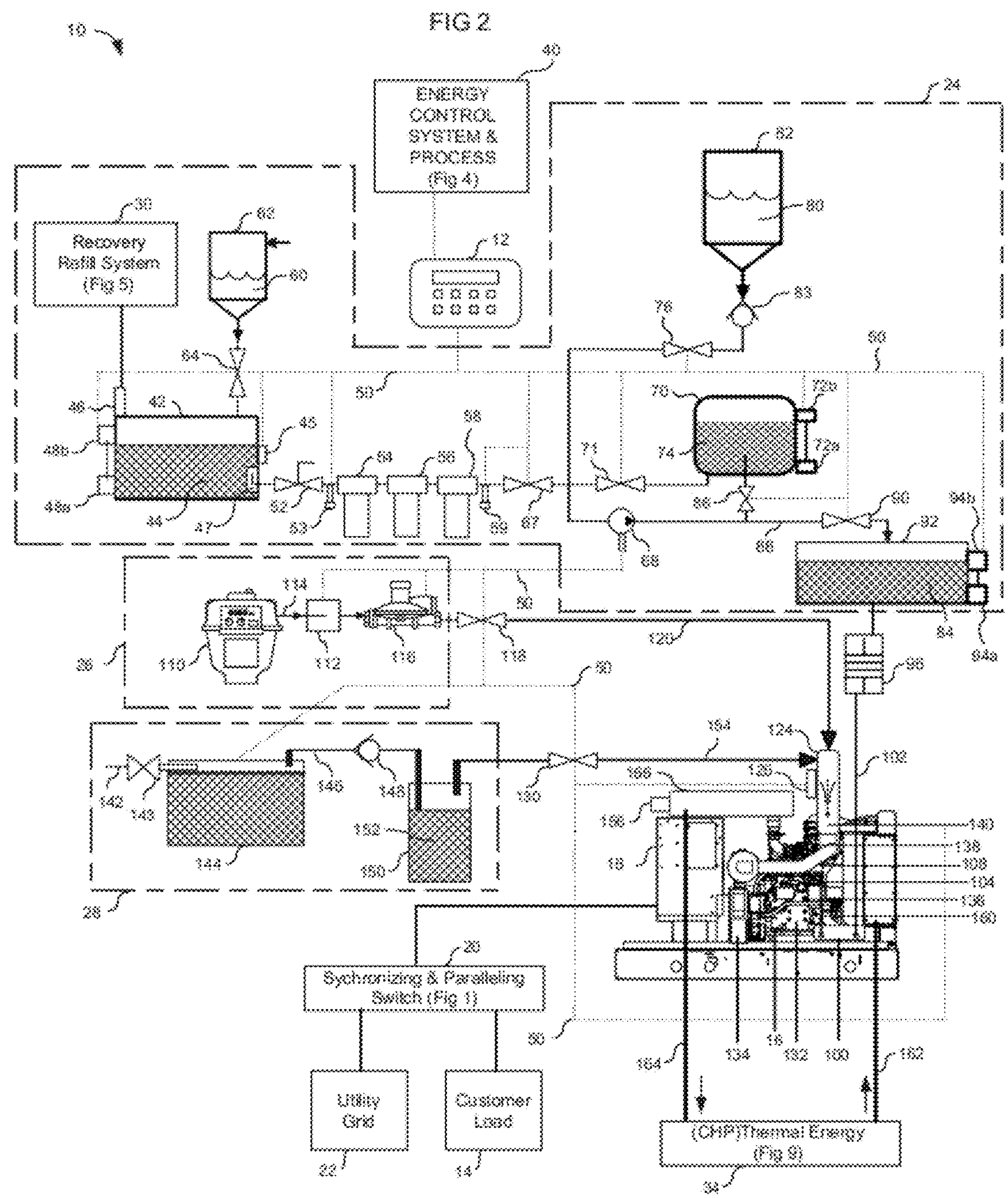
FIG. 2 is a schematic of various features of the system shown in FIG. 1.

Referring now to FIG. 2, an illustrative embodiment of various details of the system 10 is shown. The system 10 utilizes actual or sensed data, illustrated in block 40 in FIG. 2 and referred to in FIG. 4 described later herein. The microprocessor/controller 12 controls the system 10 and the various components, including the generation of a mixture of bio-fuel with at least one gas for use and combustion by the engine 16. In this regard, the system 10 comprises the bio-fuel generation system 24 (FIGS. 1, 2 and 6) comprising a storage tank or vessel 42 (FIG. 2) having a supply of waste fuel 44, such as waste cooking oil, which can be used vegetable oil, peanut oil, olive oil or other available used oil (including but not limited to used petroleum oil, used motor oil or cooking oil(s) as mentioned). In one illustrative embodiment, the user load location 14 (FIG. 1) is a conventional fast-food restaurant and the used oil is provided by the deep fryers in that restaurant. Thus, the used oil from deep fryers at a fast food restaurant can be used as a source or supply of the waste oil 44 (FIG. 2). Thus, in the illustration being described, the waste fuel 44 could be waste cooking oil from a waste oil vessel, pressed organic or other oils that are suitable for use in the system 10. The system 10 can use organic oils in either virgin condition or as "waste", such as oils used for cooking, including peanut, soybean, canola. The system 10 may also use petroleum-based oil products such as waste motor oil.

The storage tank or vessel 42 comprises an oil fill port 46 that can be used to manually fill the used waste oil or fuel 44 into the storage tank or vessel 42 or which may be coupled to the automated refill system 30 mentioned earlier and described later herein relative to FIG. 5.

The microprocessor/controller 12 continuously monitors a level of the waste fuel 44 (FIG. 2) in the storage tank or vessel 42 using a fuel level sensor **48*a* and 48*b* and a prism sensor 45, which monitors the quality and purity of the waste oil for the presence of water and other denser impurities. All of these sensors 48*a*, 48*b* and 45 are coupled to the microprocessor/controller 12 via a cable or line 50, which is shown coupled to only sensor 48*b* in FIG. 2 for ease of illustration. Again, for ease of illustration, it should be understood that throughout the figures the microprocessor/controller 12 is shown coupled to various components and parts in the system 10** by dotted lines, while some couplings or connectors are not illustrated in order to simplify the view for ease of understanding.

Returning to the illustration, the information received by the microprocessor/controller 12 is used to determine when the used oil storage tank or vessel 42 is full or empty and to notify the user to refill the tank or vessel 42 or to cause the automatic refill system 30 to initiate a refill process described later herein.

A transfer of waste fuel 44 from tank or vessel 42 will begin or be initiated by microprocessor/controller 12 through a normally open manual isolation valve 52 which causes used oil to flow into a large particle strainer or filter 54. A water separator stand pipe 47 may be provided and used to separate water in the tank or vessel 42. The waste fuel 44 is further strained and cleansed of debris, smaller particulates, moisture, acids, bacteria and other impurities through a plurality of filters, such as filters 56 and 58, constantly monitored via pressure transducers or sensors 53 and 59, which are coupled to and monitored by the microprocessor/controller 12, to determine, by way of pressure differential, whether the filters 54, 56 and 58 should be changed.

The microprocessor/controller 12 utilizes the sensed information from the fuel level sensors 48*a* and 48*b* to dispense a drying agent 60 from a drying agent supply tank or vessel 62 in a predetermined volume and at a predetermined time interval depending on the frequency of filling and emptying of the storage tank or vessel 42 by energizing a solenoid valve 64. The automatic dispensing of the drying agent 60 is fed by gravity through the solenoid valve 64 when activation is necessary or occurs.

The bacteria and moisture free and cleansed waste fuel 44 is drawn through a solenoid valve 67 by a circulating pump 68, which then pumps the oil through conduit 88 and activated solenoid valve 86 into a blending and processing storage vessel or tank 70. An oil fuel level control sensor 72*a* and 72*b*, which is coupled to the microprocessor/controller 12 via a cable or line 50, senses a level of the bio-fuel 74 in the tank 70. When a predetermined level of the bio-fuel 74 is reached, microprocessor/controller 12 deactivates the solenoid valve 67 and pump 68 and activates a chemical additive valve 76 and valve 86 and reactivates pump 68 for a predetermined time in order to allow a chemical bio-fuel additive 80 from a chemical bio-fuel additive storage tank or vessel 82 to be delivered through a check valve 83 into the storage tank or vessel 70 as shown. The primary purpose of additive 80 is to thin the waste oil, increase viscosity and increase its combustibility. Once the predetermined time has lapsed, solenoid valve 76, valve 86 and pump 68 are deactivated by microprocessor/controller 12. In this regard, microprocessor/controller 12 comprises a timer (not shown) for counting the predetermined time. In one illustrative embodiment, the additive formula is:

| B95 BLEND | | | |
|---|---|---|---|
| Hycogen Additive | Ounces | % Mix | Cost |
| WVO | 121.60 | 95.00% | 0.00 |
| CNH2N + 2 | 5.12 | 4.00% | 0.32 |
| Diesel fuel conditioner and additive | 0.64 | 0.50% | 0.03 |
| C10H8 | 0.32 | 0.25% | 0.02 |
| C6H14 | 0.32 | 0.25% | 0.02 |
| Total batch 1 gal | 128.00 | 100.00% | 0.39 |

Microprocessor/controller 12 energizes solenoids 71 (FIG. 2) and 86 and pump 68 to cause the chemical bio-fuel additive 80 to mix with the cleansed bio-fuel 74 in the storage tank or vessel 70 and is then ready to be processed and blended further via recirculation pump 68. The process of converting, mixing and blending the bio-fuel 74 with the chemical bio-fuel additive 80 continues for a predetermined time until all chemical bio-fuel additive 80 is proportionately mixed and a resulting bio-fuel 74 has been derived. Again, once the predetermined time for mixing the chemical bio-fuel additive 80 with the bio-fuel 74 has lapsed, microprocessor/controller 12 deactivates the circulating pump 68 and solenoid and solenoid valves 71 and 86.

The processed bio-fuel 74 will now be delivered to tank 92 by reactivating solenoid 71, pump 68 and activating solenoid valve 90 which causes the bio-fuel 74 to be pumped and transferred via conduit 88 through the solenoid valve 90 and into tank 92 where it is stored as processed and ready bio-fuel 84. This causes the bio-fuel 74 to be delivered and transferred as a refined or processed bio-fuel 84 into holding tank 92. At this point, the processing and refinement of the waste fry oil 44 into the processed bio-fuel 84 with additive is complete, and the solenoid valves 71, 90 and pump 68 are deactivated by microprocessor/controller 12.

The microprocessor/controller 12 may cause the bio-fuel refilling process to continue automatically and repeat itself until microprocessor/controller 12 determines, using the sensed information from a sensor 94*a* and 94*b*, that the storage tank or vessel 92 is full, with such sensed information from sensor 94*a* and 94*b* being provided to the microprocessor/controller 12 via the cable or line 50. For example, the microprocessor/controller 12 will reactivate the bio-fuel generation when the microprocessor/controller 12 determines that the level of the processed bio-fuel 84 has dropped below a predetermined low level in the holding tank 92, as sensed by the level sensor 94*a* and 94*b*, and the microprocessor/controller 12 determines that it is acceptable and safe to reactivate the bio-fuel generation process. For example, the microprocessor/controller 12 may determine that it is safe to reactivate the process if the lower level sensor 94*a* has determined that bio-fuel level is below this sensor. If the higher sensor portion 94*b* indicates that the upper limit is active on this sensor, then a signal will be sent to the microprocessor/controller 12 telling the system 10 not to reactivate wait to drop below lower level of level sensor 94*a* and 94*b*. In the illustrative embodiment, the sensors 48*a*, 48*b*; 72*a*, 72*b*; and 94*a*, 94*b* are conventional electric float sensors.

The processed bio-fuel 84 in the holding tank 92 is then drawn through a bio-fuel filter 96 and propelled through conduit 102 to a fluid-to-fluid heat exchanger 100. As mentioned, the system 10 comprises the engine 16 which comprises an injector pump 104 for injecting and distribution of the bio-fuel 84 into each individual cylinder (not shown) of the engine 16. A plurality of injectors (not shown) inject the processed bio-fuel 84 into the individual cylinders (not shown) of the engine 16 where the processed bio-fuel 84 is introduced and where the heat of compression of the individual cylinders combust the bio-fuel 84 in the predetermined mixture or ratio with the hydrogen, natural gas or propane, gases which are introduced into the cylinders by way of the intake manifold 108 of the engine 16. Thus, the processed bio-fuel 84 becomes introduced, at the point of combustion, into the cylinders (not shown) of the engine 16 in the predetermined mixture or ratio with the natural gas, liquid propane gas and/or hydrogen as described later herein. The predetermined mixture or ratio is controlled by the microprocessor/controller 12 as described later herein. As described earlier herein, when using the diesel or natural gas aspirated internal combustion engine all the gases are blended at the intake manifold 108. On a natural gas spark ignited engine, these gases are ignited in the combustion chamber of the engine. On a diesel type engine, compression is first used to ignite the atomized bio-fuel 84 first introduced in the compression/combustion chamber, then the natural gas and hydrogen are introduced via blending chamber 124 intake manifold 108.

As mentioned earlier in the embodiment, in one embodiment, the engine 16 may be a turbine engine (not shown). In a conventional turbine engine (not shown), the turbine engine sucks air in at the front with a fan, a compressor raises the pressure of the air. The compressor is made up of fans with many blades and attached to a shaft that will drive the alternator. The blades compress the air and the compressed air is then sprayed with fuel mixture of bio-fuel, natural gas and/or hydrogen in the predetermined mixture or ratio an electric spark will then light the mixture. The burning gases expand and blast out through the nozzle, at the back of the engine.

As mentioned earlier, the system 10 further comprises the natural gas or propane gas supply 26 (FIGS. 1 and 2) that is delivered to the system 10 via a conventional meter 110 (FIG. 2). For ease of description, the natural gas supply 26 is shown, but it should be understood that propane gas could be used in the system 10 as well. A gas sensor 112 is coupled to and under the control of the microprocessor/controller 12 via the communication cable or line 50 as shown. The gas sensor 112 provides information regarding gas pressure and volume to the microprocessor/controller 12 via the cable or line 50. The natural or propane gas is provided from the supply or meter 110 via conduit 114 to an electronically controlled variable regulator 116. The natural gas or propane gas is regulated through the electronically controlled variable regulator 116 which is also coupled to and under the control of the microprocessor/controller 12. The microprocessor/controller 12 controls the regulator 116 and permits or allows the natural gas or propane gas to move downstream via a gas solenoid valve 118 as shown. The gas is delivered through the gas solenoid valve 118 via conduit 120 to an air-to-gas blending chamber 124 as shown.

A sensor 126 is coupled to the microprocessor/controller 12, via the cable or line 50, and senses the pressure and density of the gas in the chamber 124 and provides the sensed information to the microprocessor/controller 12 so that a desired or predetermined amount of natural gas or propane gas is supplied to the chamber 124. The natural gas or propane will ultimately be blended and mixed by an adjustable fixed orifice or atomizing nozzle (not shown) with atomized bio-fuel 84 at the point of combustion and delivered via the intake manifold 108. The microprocessor/controller 12 controls the ratio of the amount of natural gas or propane gas that is delivered to chamber 124 and mixed with hydrogen. It should be understood that the microprocessor/controller 12 may cause no natural gas or propane gas to be delivered to chamber 124 in some circumstances as described later herein. The mixture of propane or natural gas and hydrogen from the hydrogen gas supply 28 in the predetermined and controlled mixture ratio is then provided to the intake manifold 108 which delivers it to a combustion chamber of the engine 16 in the desired predetermined ratio as provided herein.

The system 10 further comprises a plurality of sensors coupled to the microprocessor/controller 12 for providing sensed feedback regarding various parameters or conditions of the system 10. In this regard, the system 10 comprises an engine temperature sensor 132, a load and speed sensor 134, a water jacket temperature sensor 136, a governor throttle position sensor 138, which senses a position of a governor (not shown) on the engine 16, and an oxygen sensor 140. Each of these sensors 132-140 are coupled to the microprocessor/controller 12 and provide sensed information which microprocessor/controller 12 uses to control the operation of the system 10 in a manner described herein. By way of example, when natural gas and/or propane gas are available and desired to be used, microprocessor/controller 12 energizes and activates the gas solenoid valve 118, which causes the gas to be dispensed in a computed predetermined amount in the blending and mixing air-to-gas chamber 124.

The engine temperature sensor 132 is used to determine if the engine 16 is operating within desired temperature ranges so as not to overheat. A conventional on-board electronic control module ("ECM") associated with engine 16 is coupled to the microprocessor/controller 12 and senses emissions and provides data for determining optimum emissions and for improving fuel efficiencies.

The alternator load and speed sensor 134 is used to determine a speed of the engine 16 to provide data to the governor (not shown) for maintaining frequency and voltage of the engine alternator (not shown) by, for example, via monitoring the rpm of a flywheel (not shown) on the engine 16.

The water jacket temperature sensor 136 is used to determine if engine 16 is operating within the desired temperature range so as not to overheat and whether the sensed data within the onboard ECM in determining optimum emissions and improving fuel efficiencies.

The governor throttle position sensor 138 is used to determine where the governor position and a throttle valve (not shown) are in relation to the speed of the engine 16.

The oxygen sensor 140 is used to determine the amount of oxygen in the exhaust gas to improve the overall burning efficiencies of fuel mixture detonation and complete burn of various fuels and connected to microprocessor/controller 12 and the onboard ECM.

The system 10 further comprises the hydrogen supply generation system and hydrogen gas supply 28 (FIGS. 1 and 2). In the illustration, the system 10 utilizes distilled and/or purified water that is delivered via an inlet 142 (FIG. 2) through an activated solenoid valve 143 to a conventional electrolyzer 144, which is part of the hydrogen gas supply 28 as shown. The hydrogen is separated via electrical current by an electrolyzer in the electrolyzer module 144, which is coupled to the microprocessor/controller 12 via a cable or line 50. The hydrogen gas is discharged from electrolyzer 144 via a conduit 146 through a flash arrestor check valve 148 and then introduced into a bubbler 150 of the type conventionally known. The bubbler 150 comprises water 152 that scrubs remaining oxygen from the hydrogen. The microprocessor/controller 12 causes the hydrogen to be released to and through solenoid or solenoid valve 130 and ultimately to the chamber 124 in a predetermined amount to achieve the predetermined or desired mixture or ratio of hydrogen to natural gas or propane gas in chamber 124 and also in a predetermined or desired ratio with the bio-fuel 84 when introduced at the point of combustion by the intake manifold 108 to cylinders (not shown) of the engine 16. Again, microprocessor/controller 12 generates the mixtures of bio-fuel 84 and gases so that, ultimately, the engine 16 receives the hydrogen, natural or propane gas and bio-fuel 84 in a predetermined amount or ratio.

Continuing with the illustration, the hydrogen gas travels through a conduit 154 to the chamber 124 where the sensor 126 monitors the hydrogen gas injection, gas density and pressure and communicates it via the cable or line 50 to the microprocessor/controller 12. The microprocessor/controller 12 controls the actuation of the solenoid valve 130 so that the hydrogen gas is provided to the chamber 124 in the predetermined or desired amount for mixing with natural gas and/or propane gas in the predetermined or desired ratio if one or more of those gases are to be mixed with the hydrogen. As with the monitoring and control of the natural gas and propane gas provided to the chamber 124, the microprocessor/controller 12 will utilize the information from the sensors 132-140 to meter the hydrogen gas provided by the hydrogen gas supply 28 into the chamber 124 of the engine 16 where it burns in the cylinders (not shown) of the engine 16 along with the bio-fuel or even a petro-diesel fuel. The processes for generating and controlling the fuel mixture ratio is described later herein.

The resulting process of blending natural gas or propane with hydrogen and adding it to the bio-fuel 84 to provide the desired overall mixture for detonation in the engine 16 combustion chambers results in a super efficient fuel that has a lower carbon footprint and generates less CO, CO2 and NOx emissions when compared to combustion engine cogeneration systems of the past and provides improved fuel efficiency through the exhaust 156 because of the cleaner burning hydrogen and/or natural gas or propane gas. The bio-fuel is plant based and, therefore, it does not release "new" carbon to the atmosphere, which improves the overall efficiency of the system 10.

During operation, the engine 16 drives the alternator or generator to generate a predetermined amount of electricity as will be described in more detail later.

As alluded to earlier, the system 10 further comprises an optional combined heat and power (CHP) process and system 34, shown in FIGS. 1 and 9, that advantageously utilizes waste heat from the engine 16. The optional waste heat and power (CHP) process system 34 may simultaneously operate utilizing a hot water jacket 160 coolant from the engine 16. The engine internal water jacket 160 flows through the engine 16 main body through engine heads (not shown) and exhaust ports (not shown) to cool the engine 16 and keep the engine 16 from overheating, as well as help the overall performance of the engine 16. The water is pumped through the engine jacket 160 (FIG. 2) via a conventional auxiliary pump (not shown) and under normal conditions is then pumped into an external radiator (not shown), wherein the latent heat that is pickup up from the engine 16 will now be removed via the radiator (not shown) and a conventional external fan (not shown). This CHP system 34 (FIG. 9) acts similar to a conventional radiator (not shown) in that the heat that would normally be pumped into the radiator is now pumped into a heat exchanger 174 (FIGS. 5 and 9) that will be used in the auxiliary processes. In this regard, the jacket 160 (FIG. 2) is coupled to the CHP system 34 as shown. The hot water jacket 160 stores fluid, such as water and Ethylene Glycol, and utilizes heat from the engine 16 to heat the fluid or water to approximately 160°-200° F. in a water-to-air heat exchanger 166 (FIG. 2), which picks up additional thermal energy/specific heat of approximately 220° F. from engine 16 to use in numerous ancillary or auxiliary processes, several illustrative examples of which are shown in FIG. 9. Thus, the embodiments described herein utilize an internal combustion engine, an internal combustion spark or compression ignited natural aspirated or turbo charged diesel, natural gas, LP or gasoline engine whereas the thermal usage comes from water jacket and exhaust heat and the mixture of gases later herein referenced are introduced into the intake manifold of these engines. For embodiments that use the turbine or micro turbine engine (not shown) to drive the alternator 18 to supply electrical power, and the CHP processes utilize only the exhaust gas heat via a recupertor and heat exchanger (not shown) of a conventional turbine engine for the CHP thermal energy, and when using a turbine instead of the internal combustion engine 16 as described all of the fuel sources will be mixed and fed or sprayed into the conventional turbine process with the compressed air where a conventional turbine engine receives its fuel.

The heated water or fluid from an outlet (not shown) of the heat exchanger 166 is transmitted via the conduit 164 to the CHP system 34 shown in FIG. 9. The ancillary or auxiliary processes, commonly known as thermal cogeneration processes, improve the overall energy usage efficiency of the system 10 by utilizing waste heat from engine 16. This facilitates providing a complete utilization of the fuels and mixtures as well as waste heat. As heated fluid, such as water or a coolant, is provided from the conduit 164, additional thermal waste energy will typically be at a ratio of about 65% of waste energy in the form of heat derived from the BTU fuel energy content delivered to the primary combustion source, namely, the engine 16, with a balance of 35% of the same fuel energy content converted into electrical energy resulting from the engine 16 driving the alternator/generator 18 of the system 10. Utilizing a portion of the 65% of the waste heat energy can increase the overall energy efficiency of the system 10. Thus, this system 10 enables utilization of a majority of the British thermal units (BTUs) energy content of the fuels during the process of combustion, thereby efficiently capturing and utilizing the thermal waste heat generated by the engine 16 and providing a clean and efficient use of the waste heat. Thus, it should be understood that when energy is considered renewable in terms of utilizing "waste" products, the system 10 uses both waste heat and waste oil. Using waste heat applies to efficiently recovering (via heat exchangers and the CHP processes described) and transferring heat to useful purposes in the CHP process to supplant utility energy. One example is shown in WO2009/0146126, which is incorporated herein by reference and made a part hereof.

Continuing with the illustration in FIG. 9, the high temperature fluid, after being heated to approximately 220° F., is delivered via conduit 164 to at least one or a plurality of waste heat-using components. A pump 168 coupled to conduit 164 pumps the fluid into a conduit 170 and through a solenoid valve 172. Note that the microprocessor/controller 12 is coupled to and controls the pump 168 and solenoid or solenoid valve 172 and may cause the fluid to be pumped directly into a dual plate fluid-to-fluid heat exchanger 174 as shown. In the fluid-to-fluid heat exchanger 174, two different fluids, such as water (or a coolant) and oil, are used to efficiently transfer an excess of 90% of the thermal specific heat or energy from the pumped water or coolant to the oil. At this point, the fluid, water or coolant is now stripped of thermal latent heat through a phase transition of the heat transfer between the water and the oil. The now cooler water or coolant is returned via conduit 178 to a return conduit 162 back to the engine 16 (FIG. 2) as shown, where it may again regain heat. After the water or coolant is reheated it may return to the CHP system 34 via the conduit 164 as shown and the process is repeated.

On a secondary side of the heat exchanger 174 (FIG. 9), heated oil is transferred via a conduit 180 and pumped by pump 182 through solenoid or solenoid valve 184. The pump 182 further pumps and propels the oil through an injection tube 186 and into an oil fryer 188 as shown. In the illustration being described, the oil fryer 188 may be a deep oil fryer 188 of the type used in a conventional restaurant for cooking foods, such as french fries, chicken, fish patties and the like. The heated oil 176 is circulated in the fryer 188 and then is returned through a removable particulate filter screen 190 and through a conduit 192 and through a solenoid valve 194 to an inlet 174*a* of the dual plate heat exchanger 174 as shown. At the dual plate heat exchanger 174, the oil again picks up specific heat from the water or coolant being pumped through the heat exchanger 174 by pump 168 and the process is repeated.

The CHP system 34 comprises a drain valve 183 for manually draining the tank or deep fryer 188, if desired.

The CHP system 34 comprises a temperature sensor 196 for sensing a temperature in the fryer 188 and also a float sensor 198. The sensors 196 and 198 are coupled to then activate and deactivate the circulation pumps 168 and 182 and solenoid valves 184 and 194 in order to cause the oil 176 in the fryer 188 to be heated to a predetermined temperature that may be established by the user and programmed into the microprocessor/controller 12. In this regard, the microprocessor/controller 12 may be preprogrammed with parameters for heating the oil 176, which can facilitate decreasing the normal dependency on other types of heating devices for heating the oil 176 or on an external energy consumption required to heat the oil 176, such as electrical current for energizing a coil or energy or gas required to heat the oil 176. The deep oil fryer 188 may be a conventional fryer and may have a thermostat or temperature sensor (not shown) programmed by the user. The microprocessor/controller 12 may be coupled to the temperature sensor of the deep fryer 188, which may cause the CHP system 34 to be shut down, overridden or bypassed in response to the deep oil thermostat or temperature sensor. Using waste heat from engine 16 to heat deep fryer oil 176 also improves the overall efficiency of the fryer 188 and thereby improves the overall energy consumption efficiency of the system 10 at the user's facility, such as the restaurant or facility.

Thus, it should be appreciated that the CHP system 34 provides means for utilizing the thermal energy specific heat generated from the engine 16 of the cogeneration system 10. It is also envisioned that the thermal energy will be used in other ways as well. For example, FIG. 9 provides means for delivering the heated fluid of 200°-220° F. through a solenoid valve 200, which is coupled to and under the control of microprocessor/controller 12, to an absorber generator heat exchanger 202 of an absorption chiller 204. The microprocessor/controller 12 energizes pump 168 which pumps heated fluid through a conduit to a solenoid valve 200, which is also under the control of the microprocessor/controller 12, to the absorption chiller 204. Once the entrained specific heat is absorbed for the absorption cooling process, the fluid, which now has a lower latent heat, leaves the absorption chiller 204 into conduit 206 where it returns to the cogeneration system 10 via the conduits 162 and 224 where the fluid may again regain thermal energy and repeat the absorption process.

Substantially simultaneously, note that chilled water leaves the conduit 208 where it is delivered to a cooling load (not shown) where it gains specific heat and returns and enters the absorption chiller 204 through the conduit 210. Although the embodiment being described suggests the use of an absorption chiller 204, it should be appreciated that other types of absorption devices, such as an absorption heat pump could be substituted in the CHP system 34 in order to utilize the heated fluid from the engine 16.

In addition to using the heated fluid to heat oil in the deep fryer 188 and provide heated fluid for the absorption chiller 204, the waste thermal energy from the engine 16 may be used to drive other devices, such as a hot water boiler 212, in which the high temperature heated fluid from the conduit 199 may be delivered through solenoid valve 214 via conduit 216 into a boiler heat exchanger 221 which is also under the control of the microprocessor/controller 12. The fluid enters the heat exchanger conduit 216 of the boiler heat exchanger 221 at a temperature of about 200°-220° F. The high specific heat energy is absorbed via the boiler heat exchanger 221 for the purpose of heating auxiliary or ancillary hot water processes entering and leaving via conduits 218 and 220, respectively. As is conventionally known, a phase change will occur removing latent heat and resulting in a lower temperature fluid exiting the boiler heat exchanger 221 through the heat exchanger conduit 216 and returning through conduit 222 and then through the conduit 224 which is in fluid communication with the return conduit 162 as shown. Thereafter, the return fluid can regain thermal specific heat or energy from the engine 16 of the system 10 and the process repeated.

Still another utilization of the waste thermal energy from the system 10 is shown in FIG. 9 in the form of a mechanical alternator or electrical generation system 226. Heated fluid is pumped by pump 168 through a solenoid 228, which is controlled by microprocessor/controller 12. The fluid is pumped into an inlet 230 of the electrical generation system or mechanical alternator 226. In this regard, the pumped fluid enters the heat absorption heat exchanger 232 in a manner conventionally known. Once the high specific heat/energy is absorbed via the heat exchange process, a resultant electrical energy is generated by the electrical generation system 226.

Again, as with the other absorption processes in the system, a phase change will occur removing latent heat and lowering the temperature of the fluid. The fluid leaves the heat exchanger 232 through the conduit 234 which is fluid communication with conduits 224 and 162 so that the fluid can return to the engine 16 of the system 10.

As mentioned earlier herein, it should be understood that the microprocessor/controller 12 controls the components and parts of the system 34, including the processes and systems for heating the oil 176 in the fryer 188, driving the absorption cooling process through the absorption chiller 204, heating the boiler 212 and utilizing the control of the mechanical alternator is 226. It should be understood that each of those components, as well as the various sensors and solenoids illustrated in FIG. 9, are all coupled to and under the control the microprocessor/controller 12, which selectively controls the pumping of the fluid and the various components that utilize the heated fluid from the system 10. For example, under some circumstances, the microprocessor/controller 12 may cause all the heated fluid to bypass the mechanical alternator is 226, boiler 212 and absorption chiller 204 and be directed solely to the fryer 188 for purposes of heating the oil 176.

Advantageously, the system 10 and the CHP system 34 provide means and apparatus for efficiently using the waste heat generated from the system 10 and the microprocessor/controller 12 is adapted to control the utilization of the heated fluid by controlling the various components, such as the heating of the oil 176 in the deep fryer 188, the absorption chiller 204, the passing of the fluid through the boiler 212 and the mechanical alternator 226.

Figure 4:
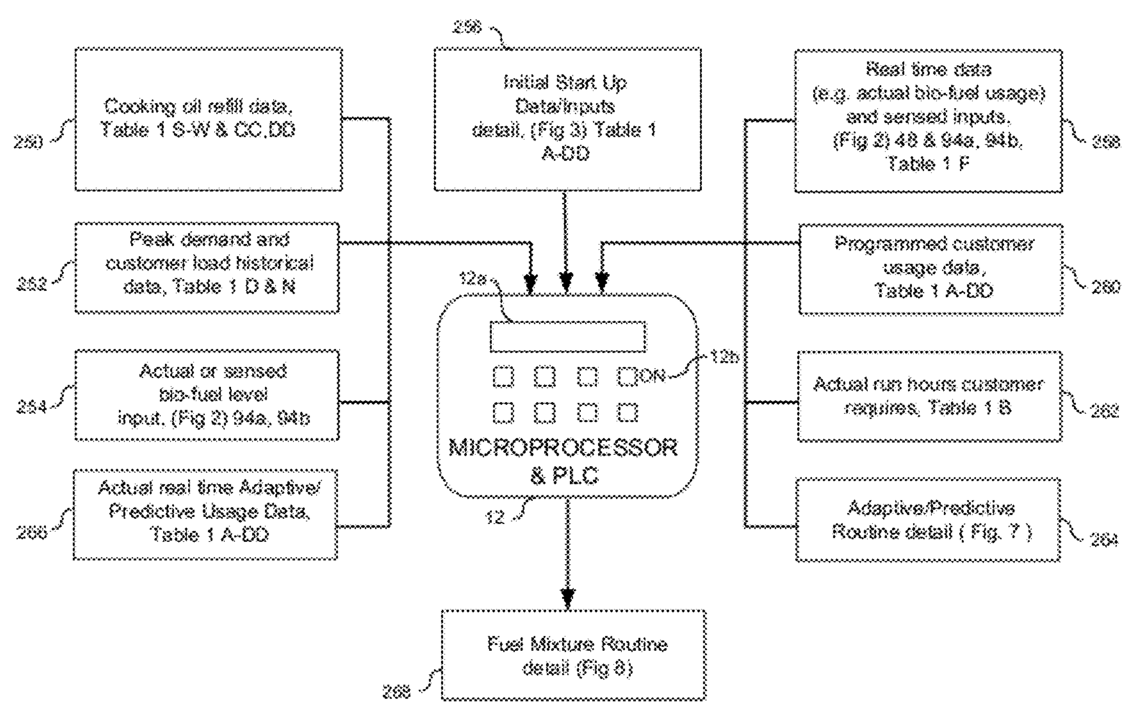
FIG. 4 is a schematic of an energy control data acquisition diagram in accordance with one embodiment of the invention.
Figure 5:
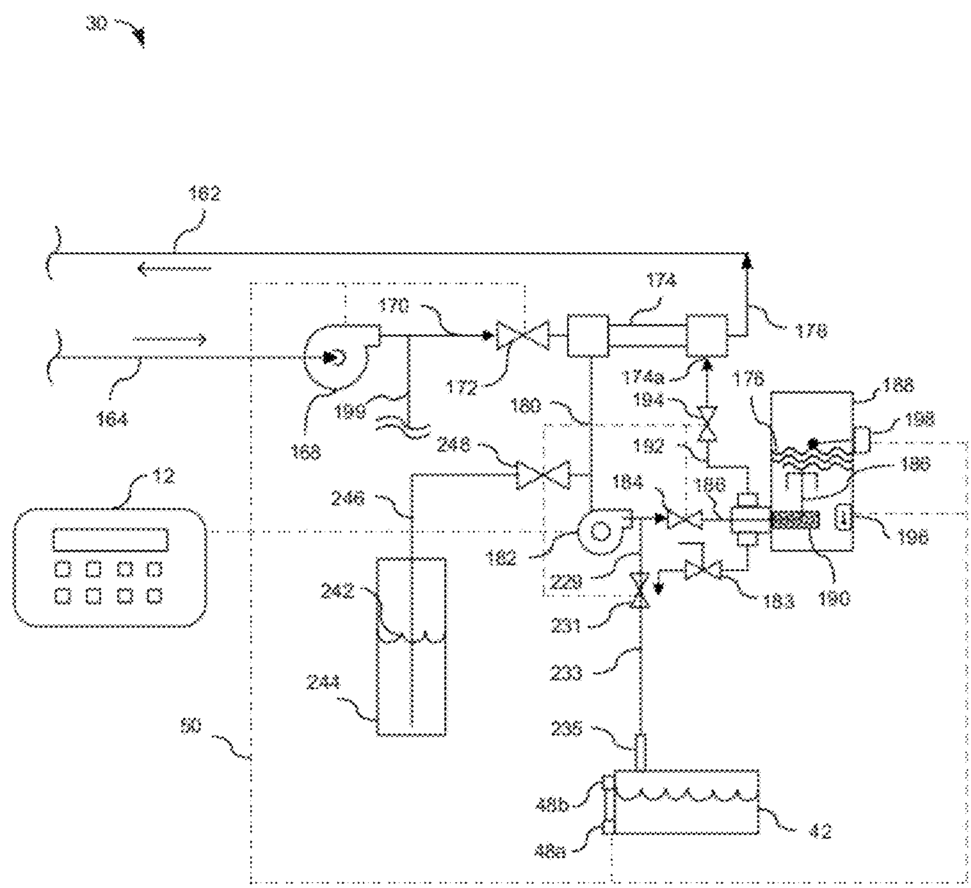
FIG. 5 is a schematic of an optional automated recovery refill system and process, which may also be part of the CHP process shown in FIG. 9.

Another unique process and system is further illustrated in FIGS. 1, 2 and 5 and comprise the oil recovery and refill system and process 30, which can be used with or without the CHP system 34. The automated oil recovery and refill system 30 automatically refills the tank 42 (FIG. 2) with waste oil to be processed as described earlier from at least one or a plurality of deep fryers 188 or 188-188*c*. For ease of illustration, one deep fryer 188 is shown in FIGS. 4 and 5, but it should be understood that multiple deep fryers 188 could be used in the systems 10 (FIG. 2), 34 (FIG. 9) and 30 (FIG. 5). The automated oil recovery and refill system 30 also refills the fryer 188 with new frying oil 242. The microprocessor/controller 12 controls the system and process 30 to automatically monitor process and replace or change the used waste oil 176 with new oil 242. In the illustration being described in FIG. 5, those parts that are the same or similar to the parts shown in FIG. 9 are identified with the same part numbers. The system and process 30 for refilling the fryer 188 facilitates improving the energy efficiency of the system 10 and provides energy savings because the automatic empty and refill of deep fryers 188 improves the overall energy efficiency of system 10 by utilizing waste heat to heat the new fluid in the deep fryers 188-188*c*. The refill process 30 also provides convenient means for refilling one or more of the deep fryers 188-188*c*.

As with the embodiment described earlier herein, the pump 168 pumps fluid from the engine 16 (FIG. 1) through the conduit 170 and solenoid valve 172, which is under the operation and control of the microprocessor/controller 12, to the heat exchanger 174, and the system and components operate in the same manner as described earlier herein relative to FIG.

9. The automated recovery and refill system and process 30 in FIG. 5 includes additional components necessary for extracting used or waste oil 176, such as cooling oil, from the deep fryer 188. In this regard, the microprocessor/controller 12 will deactivate solenoid valves 172 and 184 to close, thereby isolating an oil fryer circuit, which is shown separately and isolated in FIG. 5 for ease of illustration. It should be understood, however, that the other CHP system 34 and system 10 cogeneration uses of the heated fluid, as described earlier herein relative to FIG. 9, are not interrupted.

In the automated recovery and refill system and process 30 of FIG. 5, the oil 176 is drawn out of the deep fryer 188 through the removable particulate filter screen 190 and transferred via conduit 192 through the solenoid valve 194 and to the heat exchanger 174. The oil continues through the conduit 180 and pump 182 pumps the oil 176 through the conduit 229 and through the solenoid valve 231 which is coupled to and under the control of the microprocessor/controller 12. The microprocessor/controller 12 opens the solenoid valve 231 to cause the oil 176 to be pumped through the conduit 233 and into an inlet 235 of the tank 42 (FIGS. 2 and 5).

The microprocessor/controller 12 will activate and deactivate the removal of the oil 176 into the used cooking oil tank 42 in response to predetermined time inputs, which are programmed in timers (not shown) of microprocessor/controller 12 based on oil volume of the deep fryers 188, until all used or waste oil is removed from the deep fryer 188 or in the event the used cooking oil tank 42 is determined to be full as indicated by the fuel level sensor 48*a*, 48*b* (FIGS. 2 and 5) which senses the level of the oil 176 in the used cooking oil tank 42.

Once the oil 176 has been removed, then new cooking oil 242 from a cooking oil supply source, tank or container 244 may be delivered via conduit 246 through solenoid 248 which is coupled to and under the control of the microprocessor/controller 12. The microprocessor/controller 12 energizes the pump 182 to pump the new cooking oil 242 from the container 244 through the conduit 246 and solenoid 248 into the line or conduit 229 and through the activated solenoid 184 where the new cooking oil 242 can be pumped into and through the conduit or tube 186 and into the deep fryer 188. It should also be understood that in the embodiment being described, the microprocessor/controller 12 may be programmed to disperse the new cooking oil 242 in a timed sequence or disbursement. This sensor 198 senses the oil level in deep fryers 188 and provides a safety shut-off when the oil reaches a predetermined high level or in the event the timed sequence fails to shut down the refilling of said the deep fryer(s) 188.

For the purpose of this example, the pump 182 will pump new oil from tank 244 at 5 gallons of oil per minute. Assuming the deep oil fryer 188 capacity is 15 gallons, the microprocessor/controller 12 will be programmed to refill the deep fryer 188 in 3 minutes, and safety sensor 198 will further ensure that the deep fryer 188 is not over filled in case of malfunction. Once the time sequence is complete and the fryer 188 is filled to a predetermined level with new cooking oil 242, the microprocessor/controller 12 may then energize the CHP system 34 (FIG. 9) to use the cogeneration thermal waste heat from engine 16 to heat the new cooking oil 242 in the manner described earlier herein relative to FIG. 4. In the illustration being described, the predetermined interval or time periods at which the refill may occur or should occur may be preprogrammed by the operator into the microprocessor/controller 12.

Although the embodiments being shown and described herein relative to FIGS. 5 and 9 illustrate the use of a single deep fryer 188, a single absorption chiller 204, a single boiler 212 and a single mechanical alternator 226, it should be understood that more or fewer components could be used in the system 10. For example, a plurality of deep fryers 188-188*c* may be utilized in the system and process 30 so that the heated fluid from the system 10 may be utilized to heat oil 176 from multiple deep fryers 188-188*c*. Likewise, multiple absorption chillers 204, boilers 212 and mechanical alternator 226 may also be provided in order to efficiently and effectively utilize the heated fluid from the system 10.

Figure 10:
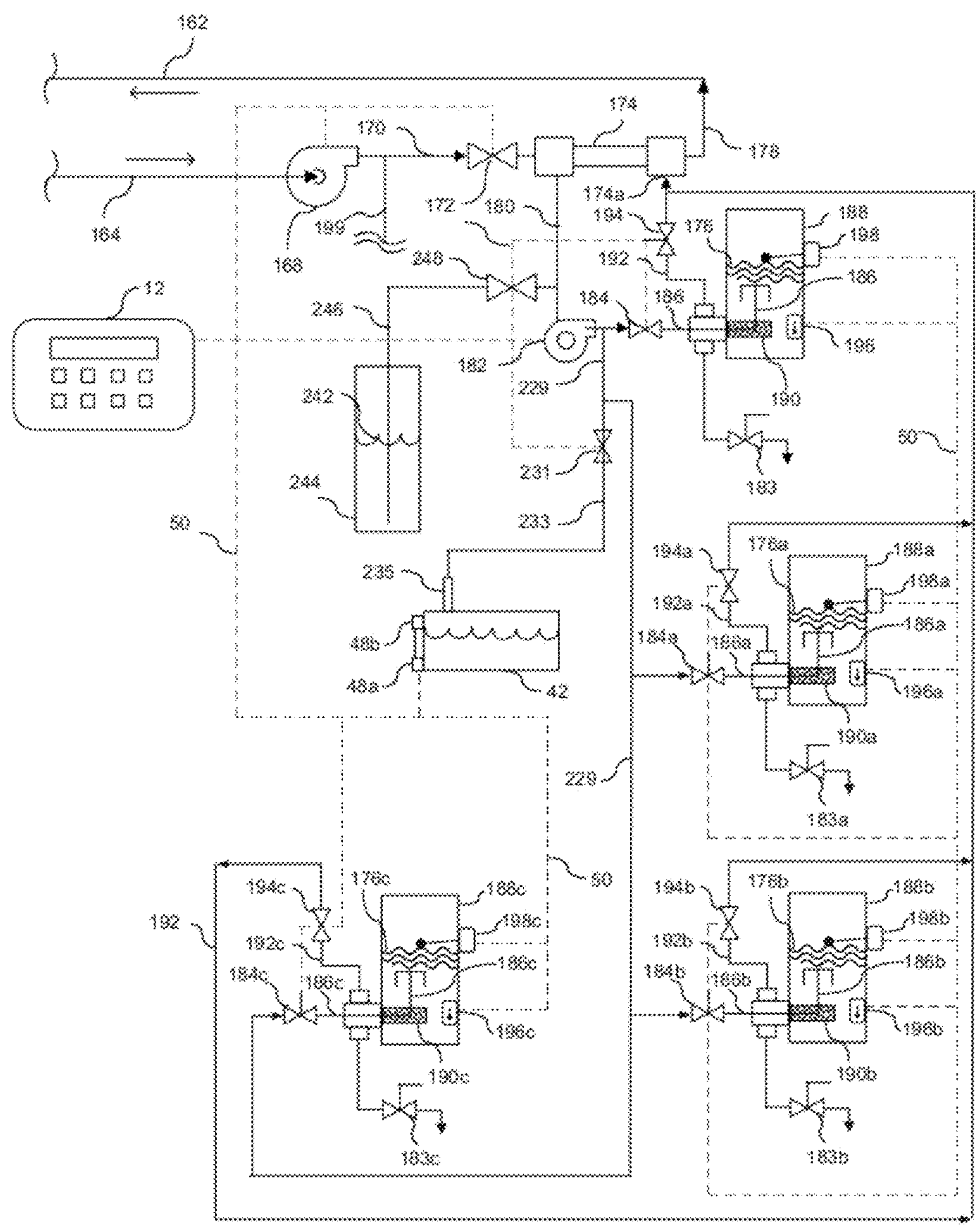
FIG. 10 is a view similar to FIG. 9, illustrating an embodiment that uses a plurality of deep fryers.

FIG. 10 illustrates another embodiment illustrating the use of a plurality of deep fryers 188, 188*a*, 188*b*, and 188*c* in the system 10. In this embodiment, those parts that are the same as the parts shown in FIGS. 5 and 9 are identified with the same reference numbers. It should also be understood that the parts or components 176*a*, 176*b*, 176*c*; 183*a*, 183*b*, 183*c*; 190*a*, 190*b*, 190*c*; and 192*a*, 192*b*, 192*c* in FIG. 10 operate in the same or similar manner as the corresponding parts or components 176; 183; 190; and 192, respectively, of the embodiment shown in FIGS. 5 and 9. This system and process is an example of the use of multiple deep fryers 188-188*c* in the recovery and refill embodiment shown in FIG. 5 previously described in detail. The multiple deep fryers 188-188*c* could also be used with the other embodiments, such as the CHP embodiment described earlier herein relative to FIG. 9.

In this multiple deep fryer embodiment of FIG. 10, the microprocessor/controller 12 utilizes the initial programmed data (FIG. 3, Table 1) to recover, refill and preheat cooking oil from, in this example, four deep fryers denoted as 188, 188*a*, 188*b* and 188*c* in the Figure. The multiple deep fryers 188-188*c*, four in this example, operate independently, but are commonly coupled in a loop via return conduit 192 and supply conduit 229 as shown in FIG. 10. In a cooking oil preheat process, the common return conduit 192 delivers actively used cooking oil, which is of lower latent heat, to heat exchanger 174 via inlet 174*a*. Here the oil is heated via heat exchanger 174 before the pump 182 draws it through conduit 180 and propels it through the supply conduit 229. This now heated oil may be delivered to all or some of the fryers depending on activation of their corresponding fryer inlet solenoid valves 184, 184*a*, 184*b* and 184*c*. In this example, all the deep fryers 188-188*c* are in parallel via conduit 229 and the heated oil motivated by pump 182 is delivered equally to each fryer via their respective solenoid valves. The heated oil enters each fryer proportionately through conduits 186, 186*a*, 186*b* and 186*c* to maintain the fryer oil well temperature to preprogrammed set points. Fryer oil well temperature is monitored by temperature sensors 196, 196*a*, 196*b* and 196*c* which send a signal to the microprocessor 12 to activate or deactivate each oil heating cycle to constantly maintain desired temperatures for all aforementioned fryers. Should fryer well oil temperature drop below set point, the microprocessor/controller 12 activates solenoid valves 194, 194*a*, 194*b* and 194*c* as required to deliver oil back to the heat exchanger via return conduit 192. All the deep fryers 188-188*c* may be recovered, refilled and preheated simultaneously or independently as required. Recovery and refill is performed as previously described in the embodiment as illustrated in FIG. 5. In the recovery process, spent cooking oil is recovered via pump 182 via recovery conduit 192 and discharged through conduit 229 into tank 42 by way of activated solenoid valve 231. Refill occurs by activation of solenoid 248 and pump 182, which draws fresh cooking oil 242 from tank 244 through conduits 246 and 180 before distributing it to fryers through supply conduit 229. If any of the respective fryer inlet solenoids 184, 184*a*, 184*b* and 184*c* are activated, fryers 188, 188*a*, 188*b* and 188*c* will be recharged with a volume of fresh oil determined by programmed data (FIG. 3, Table 1), or until safety float valve 198, 198*a*, 198*b*, 198*c* is activated.

Referring now to FIGS. 4, 6 and 9, a plurality of processes, inputs and routines are shown for illustrating the various inputs into the microprocessor/controller 12. In the illustration being described, the microprocessor/controller 12 is a programmable controller Model No. EZPLCJ-A-32, available from AVG Automation of Bettendorf, Iowa and is preprogrammed with the basic 10 instructions and programmed to accept and execute the inputted data in Table 1 below and illustrated in FIG. 3. The engine 16 further comprises the previously-mentioned onboard ECM that is interconnected with the above-mentioned microprocessor/controller 12. The engine 16 further comprises a 5520 Deep sea engine synchronizing paralleling microcontroller available from Deep Sea Electronics, of North Yorkshire, England used to run the cogeneration system 10 and a Perkins 1100 D series diesel engine available from Perkins Engines Company Limited of Peterborough, United Kingdom start-up data. Of course, other components and parts from other manufacturers may be used in the illustration being described.

As illustrated in FIGS. 1, 3, and 4 the microprocessor/controller 12 comprises a controller display 12*a* and a keyboard 12*b* (FIG. 1) for inputting various inputs and data into the microprocessor/controller 12 in a manner conventionally known. For example, cooking oil refill data 250 (FIG. 4) is input into the microprocessor/controller 12 using the keyboard 12*b*. In the illustration being described, the cooking oil refill data 250 is utilized by the microprocessor/controller 12 in association with the refill process described earlier herein relative to FIG. 5 for automatically refilling and replacing used oil 176 from the fryer 188 with new cooking oil 242 as described earlier herein. In one alternate embodiment shown in FIG. 10 and described earlier herein, the system 10 has four oil or deep fryers 188, 188*a*, 188*b*, and 188*c*. Note the data 250, at line CC in Table 1 and FIG. 3, indicates data for these deep fryers 188 to 188*c* in the illustration. In the example, deep fryer 188 holds 15 gallons of oil, deep fryer 188*a* holds 20 gallons, deep fryer 188*b* holds 20 gallons and deep fryer 188*c* holds 20 gallons combining for 75 gallons for each and every recharge cycle. An estimated 30% of this recharged cooking oil will be lost due to food absorption in-between refills, thus 52.5 gallons of bio-fuel feedstock is generated upon emptying all the fryers 188 to 188*c*. The system 10 is programmed to empty and refill at regular intervals, such as twice a week (e.g., on Monday and Thursday at 0400 hours) as programmed at data input line DD in FIG. 3, thereby giving the system 105 gallons of feed stock for each week of run time as preprogrammed in input line U (FIG. 3). This programmed empty and refill will be used as initial data inputted until the adaptive and predictive process described herein instructs the system 10 otherwise.

Other examples of data that is input into or received by the microprocessor/controller 12 includes peak demand and historical data 252. This data 252 may include the inputted data shown in Table 1 and FIG. 3; the microprocessor/controller 12 utilizes the inputted data and sensed data to automatically perform specified computations on a real time basis which is essential to the full functionality of system 10 operation. The majority of computations involve energy content in BTUs for the various fuels and/or gases that drive the engine 16 which converts combusted fuel into mechanical energy and thermal energy. FIG. 3 contains sample data used to operate a 53 kW cogeneration system on a continuous and indefinite basis as described herein. The following Table I is a description of the various data inputted into, received by or generated by the microprocessor/controller 12. For ease of understanding, the left most column corresponds to the correspondingly labeled data input line in FIG. 3. For illustration purposes, example data values are also listed here and in FIG. 3, but it should be understood that the invention is not limited to these precise values.

TABLE 1

| | DATA | DESCRIPTION OF DATA |
|---|---|---|
| A | Desired Start Time of 0600 hrs: | Preprogrammed for each day of the week for initial start-up time for the system in a typical 24 hour cycle. |
| B | Desired Run Time of 11.5 hrs: | Preprogrammed for each day of the week for number of hours of run time that satisfies the customer's greatest demand for combined thermal and electrical output in a typical 24 hour cycle Microprocessor/controller 12 may fluctuate actual run time hours based on availability of bio-fuel. |
| C | Days of the week and Weekly run Schedule: | Preprogrammed for a specific days of the week to run and use desired run time hours of run time that satisfy the customer's greatest demand for combined thermal and electrical output in a typical 24 hour cycle. Microprocessor/controller 12 may fluctuate actual run time hours based on availability of bio-fuel. |
| D | Alternator Output @ 100% of 53 kW: | Preprogrammed value for factory specified generator/alternator electrical output at 100% load. When inputted, the microprocessor/controller 12 automatically converts kW into its equivalent Btu value of 180,836. |
| E | Percentage of Load at startup: | This is a preprogrammed percent data used at startup and represents a combined thermal and electrical load thresholds that must be met before system 10 starts. This percent correlates to a predetermined set percentage based on spark spread and efficiency. |
| F | Volume Bio-fuel Used per Hr @ 100% of 5.09 gallons: | Preprogrammed value based on engine manufacturer data. Converted into gallons by the microprocessor/controller 12 after the initial kW (D) is inputted. Microprocessor/controller 12 then converts gallons into 611,000 BTUs and 179 kW of potential energy content available in the bio-fuel. |
| G | Gas Type to Blend with Bio-fuel - natural gas or LP: | Preprogrammed selection from which microprocessor/controller 12 calculates the energy content in BTUs (H) and (I) for each selected fuel. Microprocessor/controller 12 then automatically controls the amount of gas dispensed via valve 118 and blended in mixing chamber 124 based on energy content and desired mixture ratio of natural gas or LP, bio-fuel and hydrogen. |
| H | Volume of NG used per Hour @ 100% Load of 594 cu ft: | Calculated value by microprocessor/controller 12 shows volume of NG needed to run the system at 100% load based on BTUs in Cubic feet are converted into BTUs (F).BTUs |
| I | Volume LP used per Hour @ 100% Load: | Only used if LP is selected (F). Calculated value shows gallons of LP needed to run system at 100% load based on BTUs in (F). |
| J | Hydrogen Electrolyser Cal 1-5% at 2%: | Preprogrammed value of hydrogen ratio in the fuel mix. Converted to BTUs by multiplying total engine Btu requirement in (F) by the percentage (2%) to derive 12,220. Microprocessor/controller 12 automatically controls the amount of hydrogen gas dispensed via valve 118 and blended in mixing chamber 124 based on energy content and desired mixture ratio of natural gas, bio-fuel and hydrogen. |
| K | Set H2O Fixed Rate Active - Yes: | Preprogrammed to indicate percentage of hydrogen as a fuel component is fixed and will not increase or decrease. When "NO" is selected, the variable output of the electrolyzer may range from 1% to 5% and will be controlled by microprocessor/controller 12 via sensor 112 and is based on O2 emissions sensor and amount of available hydrogen. |

TABLE 1-continued

| | DATA | DESCRIPTION OF DATA |
|---|---|---|
| L | CHP Thermal Output - kW of 98.58 kW: | Calculated and/or programmed by microprocessor/controller 12 CHP Thermal output in kW as computed from initial kW value inputted in F. |
| M | CHP Thermal Output - Btu of 336,355: | Calculated and/or preprogrammed into or by microprocessor/controller 12 from kW (L). |
| N | Total Cogen kW Output of 152: | Calculated and/or preprogrammed into or by microprocessor/controller 12 by sum total of electricity and thermal energy output of cogeneration system at 100% load. |
| O | Total Cogen Btu Output of 517,191: | Calculated and/or preprogrammed into or by microprocessor/controller 12 from kW (N) |
| P | Input Grid kW Rate $/kW of $0.12/kW: | Preprogrammed inputted cost per kilowatt of utility grid electricity. Microprocessor/controller 12 converts it into its equivalent Btu value of 3,412 per kW. |
| Q | CHP Devices & usage of thermal energy by percentage: | Preprogrammed input indicating what devices will receive thermal energy generated in this application and what percentage of the thermal energy each device is expected to consume: Chiller 75% or 252,266 BTU, Deep fryer 25% or 84,089 BTU, Boiler, Spa, Pool, or WHRG. |
| R | Display Selected Devices: | Based on percentages in (Q) and thermal output in (L) microprocessor/controller 12 calculates thermal energy in BTU and kW that each device will consume on an hourly basis. Chiller BTUs, 252,266 or 73.94 kW, Deep fryer 84,089 BTUs or 24.65 kW. |
| S | Available used oil DAY - gal of 15 Gallons: | Preprogrammed value entered based upon customer's disposal of waste cooking oil on a daily basis. Will further be used in computations as needed for energy routine, adaptive and predictive computations and efficiency computations. |
| T | Available used oil DAY - Btu of 1,800,000: | Microprocessor/controller 12 calculates based on value entered in (S) further converts to kW of 528. Will further be used in computations as needed for energy routine, adaptive and predictive computations and efficiency computations. |
| U | Available used oil WEEK - gal of 105.00: | Microprocessor/controller 12 calculates based on value entered in (S). Will further be used in computations as needed for energy routine, adaptive and predictive computations and efficiency computations. |
| V | Available used oil WEEK - Btu of 12,600,000: | Microprocessor/controller 12 calculates based on value entered in (U) further converts to kW of 3693. Will further be used in computations as needed for energy routine, adaptive and predictive computations and efficiency computations. |
| W | Number of refills schedule per week of new oil of 2.00: | Preprogrammed value entered based on customer's oil drain or change out schedule for a typical week. The exact day and time will be inputted as well and will further be used in computations as needed for energy routine and adaptive and predictive computations. |
| X | Max current load peak demand in kW: | This is based on customer obtained data when the maximum load and peak demand are being consumed and charged to the customer and entered in a time of day schedule and referenced and stored with (C) Days of the week and Weekly run Schedule. |
| Y | Max current load peak demand in BTU: | BTUs is automatically converted from (X) into BTUs and will further be used in computations as needed for energy routine and adaptive and predictive computations. |
| Z | Min set point % - kW: | Determined at initial programming and determined based on data obtained by customer i.e. peak load and run time ours to determine minimum amount of energy output that is acceptable when system is running, and is set as a percentage from 25% to 100% and never lower than 25%. This will further be used in computations as needed for energy routine and adaptive and predictive computations. |
| AA | Min set point %: | Btu Data automatically converted from (Z) into BTUs and will further be used in computations as needed for energy routine and adaptive and predictive computations. |
| BB | Hrs between filter/additive changes, 150-200 hrs of 180.00: | Preprogrammed value entered anticipated volume and quality of waste oil to be processed. |
| CC | Number of Fryers and Capacity: | Enter the number of fryers being used and input specific number i.e. 1 and its capacity 15, the combined total of each fryer capacity is used in refill schedule (W) and will further be used in computations as needed for energy routine and adaptive and predictive computations. |
| DD | Day and Time schedule to drain and refill Fryers: | The specific day and time that the draining and refilling of deep fryers 188-188c will take place and will further be used in computations as needed for energy routine and adaptive and predictive computations. |

An actual bio-fuel level of the bio-fuel 84 available in the system 10 at startup is also inputted (block 254 in FIG. 4) into the microprocessor/controller 12. In this regard, the actual bio-fuel level may be obtained by a visual inspection of the container 92 (FIG. 2) or may be provided by the sensor 94*a*, 94*b*.

Real time data 258 is also input into or received by the microprocessor/controller 12 and may include, for example, actual or anticipated bio-fuel usage at a customer facility and the sensed inputs which are the actual sensed inputs from the sensors 134-140; 48*a*, 48*b*; 72*a*, 72*b*; 94*a*, 94*b*; 112, 126, 132, 196, 198.

Programmed customer usage data 260 is also input (block 260) into the microprocessor/controller 12 and includes customer required actual run hours 262 relating to the actual hours the cogeneration system 10 is run. This data 262 generally corresponds to a customer's total peak electrical energy consumption during a period when a majority of the electrical energy of a consumer's consumption or demand occurs. The grid sensor used to determine peak demand electrical energy consumption or electrical current is sensed via current transducers located internally in synchronizing paralleling switch control box 20, these known, but not shown, current transducers constantly measure the current to the customer load center from the utility grid 22 to help determine the amount of energy that will be needed and delivered from either alternator 18 or from utility grid 22 and are necessary for helping to determine peak electrical demand for the customer facility. For example, during a normal business day, a consumer may have high demand during eleven and one-half hours when its business is open, but twelve and one-half non-peak hours, such as at night when the business is closed.

The microprocessor/controller 12 is also programmed with and utilizes an adaptive/predictive energy usage routine 264 (FIG. 7) which microprocessor/controller 12 uses to predict the user's actual usage based upon the actual, historical, and other data mentioned and adapt the system 10 so that microprocessor/controller 12 controls usage of bio-fuel 84 and the fuel mixture ratio, which results in reducing energy costs, increasing efficiency and/or reducing the user's carbon emissions. The adaptive/predictive energy usage routine 264 will be described later herein relative to FIG. 7. The adaptive/predictive energy usage routine 264 also utilizes real-time adaptive/predictive usage data 266 (FIG. 4). Thus, it should be understood that the adaptive/predictive energy usage routine 264 shown at block 264 in FIG. 4, generates the actual real-time adaptive/predictive usage data 266 to control the operation of the cogeneration system 10 as will be described in more detail later herein.

As mentioned previously, the system 10 comprises the energy control system and process 40 (FIG. 4) that further comprises and utilizes a fuel mixture routine (FIG. 8) which microprocessor/controller 12 uses to generate a desired fuel mixture ratio for providing a desired mixture of the various fuels, such as the natural gas, propane gas, hydrogen and bio-fuel, to provide a cost efficient and energy efficient mixture that is, at least in part, dependent upon the amount of bio-fuel that is available in the system 10.

Using the various data, inputs, actual usage data and routines (blocks 250-268); the microprocessor/controller 12 controls the operation of the system 10 in a manner that will now be described relative to FIGS. 3, 6 and 8. Referring now to FIG. 8, the system 10 initially starts by processing fuel 44 into refined bio-fuel 84 (block 270) in a manner alluded to earlier herein relative to the description of FIG. 2 and as will be described in more detail relative to FIG. 6. The microprocessor/controller 12 starts the engine 16 (block 272 in FIG. 8) and initiates a fuel mixture ratio routine (FIG. 8). The process of adjusting the ratio of fuels and fuel mixture is described later herein. The fuel mixture ratio is initially set to run 98% bio-fuel and 2% hydrogen if enough bio-fuel is available to meet the user's required actual run hours while running at 98% bio-fuel and 2% hydrogen. The microprocessor/controller 12 may adjust this ratio and the ratio of natural gas or propane gas that is mixed with the hydrogen if there is not enough bio-fuel 84 as described later herein. The microprocessor/controller 12 will utilize the various data 250 (FIGS. 3 and 4), including data obtained by the adaptive/predictive routine mentioned earlier herein and described in more detail relative to FIG. 7, along with the user's actual demand run time. Again, however, the first primary desired fuel mixture and ratio to use is to run the system 10 on approximately 98% bio-fuel, which is generally less expensive and more environmentally friendly than, for example, diesel fuel, and 2% of fixed metered hydrogen from the hydrogen gas supply 28 mentioned earlier.

In the illustration being described, the mixture of 98%/2% is continued during the user's programmed daily run time interval and is based solely on the run time hours initially input by the user, which are based on the consumer's electrical current load demand or requirements for electricity. The demand level is determined either empirically, by the adaptive/predictive energy usage routine 264 (FIG. 7), or either current or historically known availability of the supply of bio-fuel. For example, if the data suggests that an adequate amount of processed bio-fuel 84 is available to run the system 10 at a mixture ratio of 98% bio-fuel and 2% of fixed metered hydrogen for an entire daily run time (e.g., eleven and one-half hours), then no additional blending of the hydrogen with natural gas or propane will occur, which facilitates efficiently burning the bio-fuel and will facilitate lowering the emissions and overall carbon footprint of the system 10.

In contrast, if the initial start up data or the data obtained by the adaptive/predictive energy usage routine 264 (FIG. 7) suggests that there is not enough bio-fuel 84 to run the system 10 the entire length of the inputted daily run time interval (block 260 in FIG. 4) which is programmed by the user into the microprocessor/controller 12, then the microprocessor/controller 12 will automatically determine the amount of available bio-fuel 84 and blend natural gas NG and/or propane to a predetermined ratio. In the illustration being described, the microprocessor/controller 12 will cause an adjustment of the fuel mixture up to a maximum amount of 73% natural gas and a minimum of 25% bio-fuel along with the fixed rate of 2% of fixed metered hydrogen. The microprocessor/controller 12 adjusts the fuel mixture ratio by controlling and metering the natural gas or propane gas supply 26 (FIG. 2), hydrogen gas supply 28 and bio-fuel 84 supplied to the engine 16.

In one embodiment, microprocessor/controller 12 will continually monitor the bio-fuel mixture and may adjust it based upon one or more of the data shown in Table 1 or upon data it receives from the various sensed or pre-programmed inputs mentioned herein. For example, initially the fuel mixture ratio will be 98% bio-fuel and 2% hydrogen. If microprocessor/controller 12 determines an adjustment is required to the fuel mixture ratio, it will adjust the ratio. Microprocessor/controller 12 determines that an adjustment may be necessary based upon available bio-fuel, desired run time from inputted run time data (FIG. 3 Table) and will adjust the ratio and decrease the amount of bio-fuel used in the fuel mixture and increase at least one of hydrogen, natural gas or propane to compensate for the reduction of the bio-fuel. Microprocessor/controller 12 will calculate or determine how much bio-fuel 84 it needs to run and whether it can run the desired number of run time hours as determined at blocks 287 (FIG. 8), 288 or 289 of the fuel mixture routine shown in FIG. 8. It automatically calculates the amount of hours it can run divides the amount of bio-fuel into the run time hours and compensates for any deficiency of bio-fuel with natural gas, propane or hydrogen. In a preferred embodiment, the fuel mixture ratio is fixed for the run time period.

Stated another way, microprocessor/controller 12 will maximize and run system 10 using 100% available bio-fuel during the actual run time hours and the balance of the fuel mixture will be made up using at least one of or a combination of natural gas, propane or hydrogen.

In the example, the balance of the fuel mixture will be made up of natural gas and the hydrogen will be held constant at 2% of the fuel mixture ratio. The microprocessor/controller 12 is programmed and/or calculates the available BTU equivalent of each available fuel, such as natural gas, propane, bio-fuel 84 and hydrogen. The microprocessor/controller 12 will compare the BTU availability from the bio-fuel 84 and the BTUs required by engine 16 at full load which is inputted as data input (Table 1, F). If bio-fuel 84 is available to meet the BTU desired of engine 16, then the microprocessor/controller 12 will use as much bio-fuel 84 as is available in the fuel mixture ratio, up to 98% of the fuel mixture ratio, with any balance being made up with natural gas, propane and/or hydrogen. Again, in one example, 2% of the fuel mixture ratio will be made up of hydrogen.

If enough bio-fuel 84 is not available, microprocessor/controller 12 will add at least one of natural gas, propane or hydrogen to the fuel mixture ratio, unless the amount of bio-fuel 84 in the fuel mixture ratio equals or falls below 25% in which case, microprocessor/controller 12 will energize synchronizing parallel switch 20 (FIG. 1) to cause the system 10 to run on the utility grid 22.

So it should be understood that in one illustrative embodiment, it is desired to always have system 10 running on at least 25% of bio-fuel 84 in the mixture. Accordingly, microprocessor/controller 12 or the user may adjust the actual run time hours to achieve this goal.

In one illustrative embodiment, at no time during the operation of the system 10 will the portion of the bio-fuel be less than 25% of the total fuel mixture. Thus, for example, if the microprocessor/controller 12 has instructed the system 10 to run for eleven and one-half hours for a single daily run time based upon the input data 262 (FIG. 4), and the available bio-fuel is only enough to run the system 10 for eight hours at 100% bio-fuel usage, then the microprocessor/controller 12 will intuitively automatically adjust the mixture, as depicted in the fuel mixture routine at block 288 of FIG. 8, 50% bio-fuel, 48% natural gas and the fixed amount of 2% of fixed metered hydrogen. After initial start up, the microprocessor/controller 12 will adjust the fuel mixture ratio of bio-fuel, hydrogen, natural gas or propane gas based on the historical and real time data, including data associated with the amount of bio-fuel available, so that the system 10 will at all times run with a predetermined minimum amount of bio-fuel, which is 25% in the illustration being described.

Thus, in one embodiment, the system 10 will always run on a predetermined amount of bio-fuel, such as 25% in the illustration being described, and if the microprocessor/controller 12 determines system 10 cannot run the entire desired run time (e.g., eleven and one-half hours) at a predetermined minimum threshold, such as 25% bio-fuel and the threshold data value E (FIG. 3, Table I), which is the startup load percentage, then the microprocessor/controller 12 will cause the system 10 to remain on the utility grid 22 until a minimum percentage is available. The microprocessor/controller 12 also utilizes an overall minimum efficiency which correlates to a cost efficiency between the utility grid 22 cost and the cost of the fuels uses in the fuel mixture, conventionally known as the "spark spread."

Returning to the start routine in FIG. 8, after the initial setting of the ratios as mentioned relative to block 272, the microprocessor/controller 12 waits for a correct engine speed (block 274), and thereafter, the routine proceeds to decision block 276 where it is determined whether the engine 16 temperature has reached a desired temperature, which will depend upon the engine 16 used in the system 10. In the illustration being described, the engine 16 is a Perkins 1104D series Diesel engine, 4.4I, turbo charged, available from Perkins Engines Company Limited of Peterborough, United Kingdom. The CO2 gas temperatures are monitored by sensor 140 (FIG. 2), and if they are not above a predetermined temperature, then the engine 16 is not "warmed-up" and the routine waits until the temperature is at a desired or predetermined temperature. Once the predetermined temperature is achieved, the routine or process proceeds to block 278 (FIG. 8) where the microprocessor/controller causes the system to continue running based on runtime data and bio-fuel 84 availability as determined by adaptive and predictive routine described herein relative to FIG. 7.

The fuel mixture routine (FIG. 8) proceeds to block 280 wherein the microprocessor/controller 12 energizes the water solenoid valve 143 (FIG. 2) to activate the hydrogen gas supply 28 and hydrogen electrolyzer (block 282). The microprocessor/controller 12 energizes solenoid or solenoid valve 130 to activate and send (block 282 in FIG. 8) regulated hydrogen to the blending chamber 124 (FIG. 2). It should be understood that during the initial start-up, as mentioned earlier herein, no natural or propane gas would be provided to the chamber 124 and the microprocessor/controller 12 would cause the system 10 to run on 98% bio-fuel and 2% of fixed metered hydrogen from hydrogen gas supply 28 by energizing valve 130 and the electrolyzer 144. After the initial start-up, the microprocessor/controller 12 may determine, based upon the aforementioned data and sensed inputs, that it is necessary to reduce the amount of bio-fuel usage and compensate for the reduction by increasing or providing natural gas into the chamber 124 to be combined with the 2% metered hydrogen. The microprocessor/controller 12, therefore, may change the fuel mixture ratio (block 286) to meet the desired parameters using data from the various inputs 250-266 (FIG. 4), bio-fuel level and the various sensors in the system 10. In one embodiment, the final mixture is adjusted using the routine mentioned later in FIG. 8 which will now be described.

FIG. 8 illustrates one embodiment of a fuel mixture that may be stored in memory (not shown) of the microprocessor/controller 12. The fuel mixture routine starts or initiates the system 10 based on run time data and bio fuel availability, and the mixture is adjusted based upon available bio-fuel and by the adaptive and predictive routine described herein relative to FIG. 7. As previously mentioned, the microprocessor/controller 12 will generate a fuel mixture ratio of 98% bio fuel and 2% hydrogen for combustion by the engine 16 if enough bio-fuel is available for the entire described run time as described earlier.

The routine proceeds to decision block 284 where it is determined that the data or any sensed input, by the microprocessor/controller 12 that the system 10 can run the system 10 on 98% bio fuel and 2% hydrogen for the entire run time. If it can, then the microprocessor/controller 12 operates the system at the 98% bio fuel and 2% hydrogen mixture.

If it is determined at decision block 284 that the system 10 cannot run 98% bio fuel and 2% hydrogen for the entire run time, then the routine proceeds to block 286 where the mixture of fuels is changed by the microprocessor/controller 12. In general, the microprocessor/controller 12 will increase the amount of natural gas in the fuel mixture, while maintaining the same 2% hydrogen in the total mixture, for the duration of the run time. As mentioned earlier herein, in the illustration being described, the maximum amount of natural or propane gas in the total fuel mixture is preferred to be less than 73% of the total fuel mixture, with bio fuel making up at least 25% of the mixture and hydrogen being held constant at approximately 2% of the bio fuel mixture. Of course, these percentages can change if desired, such as in the event a conventional spark-ignited engine capable of running on 100% natural gas is used as the engine 16.

Returning to the routine illustrated in FIG. 8, the routine continues to at least one of the blocks 287, 288 or 289, which is selected or determined by the desired ratio to be achieved. The microprocessor/controller 12 continuously and in real time adjusts the mixture ratio using the data, inputs and sensed information, as well as the data regarding the availability of bio-fuel 84 to achieve the desired ratio selected at block 287, 288 and 289. While the illustration shows three examples of ratios in blocks 287, 288 and 289, it should be understood that more, fewer or different percentages and ratios of fuels may be used. As mentioned, if the available bio-fuel falls below an adequate amount to run the system 10 for the user's or customer's entire daily actual run time, then the ratio of bio-fuel 84 to the other fuels in the mixture, whether it be hydrogen alone (block 290 in FIG. 8) or the mixture of hydrogen with natural gas or propane, will be reduced in response to the available bio-fuel 84. In one illustrative embodiment, the amount of bio-fuel 84 used in the ratio will be reduced from 98% bio-fuel/2% of fixed metered hydrogen (block 290 in FIG. 8) to a mixture of not less than 25% bio-fuel 84, with the balance of the mixture being made up of, for example, up to 73% natural gas or propane and a fixed rate of 2% of fixed metered hydrogen (block 290 in FIG. 8). In this regard, it should be understood that the ratio of natural gas or propane to hydrogen may also be adjusted depending on availability of hydrogen, natural or propane gas.

Referring back to FIG. 8, the microprocessor/controller 12 continues to run the system 10 (block 291) and continues to monitor and adjust the system 10 based upon the preprogrammed data, inputs or sensed inputs and also using the adaptive/predictive routine described later herein relative to FIG. 7. As the system 10 runs, electricity is produced by A/C power alternator/generator 18 (FIG. 1) and is used to replace, supplement or synchronize with electricity from the utility grid 22 (FIG. 1).

At the end of a normal daily run time interval or if a user's power demand is low, then the microprocessor/controller 12 may stop the system 10 so that the entire user's power comes from the power grid 22.

As mentioned earlier, relative to the embodiment described in FIGS. 1 and 2 and the block 270 in FIG. 8, it may be necessary at the start up of the system 10 to prepare or process bio-fuel for use by the system 10. As alluded to earlier, it is desirable in the embodiment being described to always have enough bio-fuel available so that the system 10 can preferably run at least 25% bio-fuel, with the balance of the fuel mixture being made up of hydrogen and/or natural gas or propane. One illustrative embodiment for processing or making the bio-fuel using the system 10 shown in FIG. 6, which will now be described in more detail.

A microprocessor/controller 12 initially checks the filters and pressure transducers or sensors 53 and 59 (block 293 in FIG. 6), and if they need service, they are serviced (block 296 in FIG. 6). The microprocessor/controller 12 determines (block 294) in FIG. 6 whether the processing of bio-fuel is necessary or desired based upon the available bio-fuel 84 in tank 92 as determined by sensors 94*a*, 94*b* (FIG. 2). If the microprocessor/controller 12 determines that it should not run the bio-fuel production process, then the routine proceeds to block 295 (FIG. 6) where the microprocessor/controller 12 re-evaluates the off state of no processing of bio-fuel within a predetermined time, such as every 30 minutes. Also, the refill data and time periods alluded to earlier, such as refill twice a week in the example, is reevaluated and adjusted by microprocessor/controller 12. Thereafter, the routine loops back to decision block 294 as shown.

If the decision at decision block 294 is affirmative and the microprocessor/controller 12 determines that processing the waste cooking oil is necessary or desired and sensor 94*a* determines that the bio-fuel 84 is at or below a predetermined bio-fuel 84 low level, the microprocessor/controller 12 uses the sensed information from sensors 48*a*, 48*b* in tank 42 (block 297 (FIG. 6)) to determine if waste oil feedstock 44 is at or above a waste oil predetermined high level. If the microprocessor/controller 12 determines that the level of waste oil feedstock in tank 42 is not at the predetermined waste oil high level, then the routine proceeds to block 295 and the microprocessor/controller 12 re-evaluates the off state of no processing. If the available bio-fuel 84 sensed by fuel level sensor 94*a*, 94*b* is not enough to run the system 10 using a fuel ratio that has at least 25% bio-fuel, then the microprocessor/controller 12 determines that there is not enough bio-fuel 84 available and activates the switch 20 (FIG. 1) to cause the customer to obtain all of its electrical requirements from the utility grid 22 (block 298 in FIG. 6).

If the decision at decision block 297 (FIG. 6) is affirmative, then the routine activates a bio-fuel generation or refining process (block 300). The microprocessor/controller 12 energizes solenoid valve 64 (FIG. 2) to add a drying agent 60 to the bio-fuel 84 (block 302), initiates a predetermined drying agent timer (block 304), and when the drying agent timer is finished (block 306), a predetermined amount of agent has been added to the waste oil 44. The routine then continues to (block 308) activated solenoid valve 67, the microprocessor/controller 12 then energizes solenoid valve 86 and pump 68 (block 310) until the sensor 72*b* senses that the bio-fuel 84 has achieved an upper level (block 312) in which case the microprocessor/controller 12 deactivates the solenoid valve 67, 86 and the pump 68 (block 314).

At this point in the routine, the microprocessor/controller 12 initiates a predetermined chemical additive timer (block 316) during which the solenoid valve 76, 86 are activated along with pump 68 by the microprocessor/controller 12 and the chemical additive 80 is added to the tank 70 (block 318). After the microprocessor/controller 12 determines that the chemical additive 80 has been added for the predetermined time (block 320), it deactivates the solenoid valve 76, 86 and pump 68 (block 322) and then initiates a predetermined mixing chamber timer (block 324). At this point, the microprocessor/controller 12 activates the mixing chamber solenoid valves 71 and 86 (block 326) and activates circulating pump 68 (block 328) which causes the chemical additive and oil to be mixed in the tank 70.

When the microprocessor/controller 12 determines that the mixing chamber timer is finished (block 330), the pump 68 is deactivated (block 332) and the solenoid valves 71 and 86 are deactivated (block 334). The microprocessor/controller 12 activates the bio-fuel or solenoid valve 90 and 71 and pump 68 (block 336). The microprocessor/controller 12 waits for the mixed bio-fuel tank 70 to completely empty below a predetermined low level (block 338) at which point the solenoid valve 71, 90 and pump 68 are deactivated (block 340).

Thereafter, the routine proceeds to decision block 342 where the bio-fuel level sensor 94*a*, 94*b* senses whether the bio-fuel is less than a predetermined low level (FIG. 2). If it is, then the routine proceeds to block 344 and then loops back to decision block 294 as shown. If it is not, then the tank 92 is above the predetermined high level (FIG. 2), and the microprocessor/controller 12 determines that enough bio-fuel is available in the tank 92 to run the system 10 (block 346).

At this point, the microprocessor/controller 12 activates a 24-hour daily run timer (block 348) and runs the system 10 for the desired run time, which was input into the microprocessor/controller 12 by the user. Recall that the customer load and demand data (block 350) was previously or is currently input into the microprocessor/controller 12 using the keyboard 12*b*. The inputting of the load and demand data can occur at any time prior to running the system 10.

Returning to the example, after the customer load and demand data is input into the microprocessor/controller 12 at block 350 in FIG. 6, the routine proceeds to decision block 352 where it is determined whether the load and peak demand are low. If they are, then the microprocessor/controller 12 pauses the system 10 and activates the synchronizing parallel switch 20 to cause the user or customer to obtain power from solely the utility grid 22 (block 354).

If the customer demand is above a predetermined level, such as when a combined thermal and electrical load on cogeneration system 10 at or above the load percentage startup data item (E in FIG. 3 and Table I), then system 10 is initiated and the CHP system 34 will deliver approximately 65% of its energy in the form of wasted heat and converts it into useful energy so depending on the situation and the customer needs. In general, however, activation of the system 10 to cogenerate electricity will typically occur above a 60% full mechanical load requirement of the engine 16. It is then determined whether the customer's electric current or desired load and demand requirements are high, and if they are, the microprocessor/controller 12 begins synchronizing, via switch 20, and running the cogeneration system 10 so that the electric generated runs in synchronization or parallel with the utility grid 22 (block 356). The customer's electric load requirement will vary depending on the customer or user's requirement. It should be understood that the microprocessor/controller 12 will run the cogeneration system 10 and utility grid 22 in parallel in order to maximize and efficiently utilize the available resources, especially the available bio-fuel, so as to minimize the overall cost of the electric supplied to the user customer and, if desired, to also minimize the customer's emissions of CO, CO2 and NOx gases.

After the bio-fuel processing is complete and the system 10 has begun running the fuel mixture in accordance with the embodiments described herein, such as the illustrative fuel mixture routine shown in FIG. 8, the microprocessor/controller 12 continues to monitor, adapt and control the operation and synchronization of the system 10 to provide and meet the customer's demand at the lowest possible cost and based upon the available bio-fuel 84 supply. In one illustrative embodiment, the microprocessor/controller 12 comprises the adaptive/predictive routine 66 (FIG. 7) that it uses to adjust the system 10 in real time to run efficiently, effectively and/or to achieve the lowest amount of cost per kilowatt hour electrical usage. As mentioned earlier, the routine adjusts the fuel mixture ratio routine (block 358 in FIG. 6). The adaptive/predictive routine will now be described relative to FIG. 7.

The microprocessor/controller 12 initiates the adaptive/predictive routine (block 360 in FIG. 7) and begins by monitoring (block 362) the customer's load (block 362) or electrical usage and stores the data associated with such load or usage at a predetermined interval, such as ten minutes in the illustration being described. The microprocessor/controller 12 further monitors current and load (block 364) of the utility grid 22 (FIG. 1), customer load location 14 (FIG. 1), and the cogeneration power data (FIG. 3 and Table I) all via synchronizing parallel switch 20. After a predetermined time, such as one hour in the illustration being described, the microprocessor/controller 12 compares (block 366) the pre-entered or historical data that was entered into the microprocessor/controller 12 by the user to an actual demand and load data that is obtained in real time. The microprocessor/controller 12 stores this data in memory (not shown). The grid sensor used to determine peak demand electrical energy consumption or electrical current is sensed via current transducers (not shown) located internally in synchronizing paralleling switch control box 20, these known but not shown current transducers constantly measure the current to the customer load center from the utility grid 22 to help determine the amount of energy that will be needed and delivered from either alternator 18 or from utility grid 22 and are necessary for helping to determine peak electrical demand for the customer facility.

The routine continues by performing a computation (block 368) using one hour's worth of data. At block 368, the first six ten minute pre-load data recordings are accumulated and their sum is divided by six in the illustration. The resultant value is stored as a real time first hour load result. This process repeats for each hour of a twenty-four hour period (block 370). It should be understood that while the ten-minute interval has been selected for ease of illustration, shorter or longer intervals may also be used.

The routine continues to block 372, wherein after a twenty-four hour run time, the real time load data per hour is added to the inputted historic or pre-entered data for the same one hour periods in the twenty-four hour period (e.g., 11:00 a.m. actual entered to 11:00 a.m. pre-entered data). The summed number is divided by two to provide a new one-hour computation for each hour of the day. At block 374, the new one hour computation for each hour of the day is entered and used for the corresponding hour of the next twenty-four first hour period. Thus, this microprocessor/controller 12 senses actual usage by the user or consumer, and using that data with historic data, predicts or adapts the system 10 in response to that usage.

The routine continues the above process for a twenty-four hour input period (block 376) and then for seven days for each week so that the system is adjusted for each hour of every day and for each day of the week. The seven day predictive schedule is then used by the microprocessor/controller 12 to adapt and run the system 10.

Advantageously, the adaptive/predictive routine takes each day of a week and for each hour of a day; there is a historical data or pre-entered data that is compared to the actual demand and load data, as determined by the microprocessor/controller 12. These data values are summed and averaged to provide an adjusted data value which will be used for each hour of every day. The adjusted data value will also be used and compared to an actual demand and load data value in the future so that the system 10 is continuously adapting to and predicting the customer's load or electrical usage and adjusting the electrical output and fuel mixture ratio for each hour of each day of a week.

The routine in FIG. 7 continues to block 378 wherein the microprocessor/controller 12 causes a predictive timer to start and substantially simultaneously initializes and begins running the cogeneration system 10 in accordance with the adaptive fuel mixture routine described earlier herein relative to FIGS. 8 and 10. The real time data and one-hour calculations in the illustration being described are continuously performed and stored in a register or memory accessible by the microprocessor/controller 12 for future usage by the predictive timer. The stored data provides a predictive schedule and enables the microprocessor/controller 12 to run the system 10 in accordance with the adaptive/predictive schedule that was learned for the previous week's data (block 380 in FIG. 7). In this regard, it has been found that the previous week's data is useful in determining the peak load demand's of the customer, especially during start-up and running of the cogeneration system 10.

In another illustrative embodiment, one or more seven day timer values for a first one week period can be computed and added to a previous or second seven day timer values for a different one week period and then averaged as shown at block 382. The averages can then be used to provide a new set of predictive values that the microprocessor/controller 12 can use to run the system 10. It should be understood that more or fewer data values may be used to run the system 10. It is desirable that running the adaptive/predictive routine over one or several weeks and using an average involving more weeks can provide a very accurate prediction of the customer's usage of electricity for each day and each hour of a day.

In the example, the average seven day timer values over a week period are determined, added to a previous seven day period, divided by two, and the averages are used for the next seven day usage schedule as shown as block 382. The microprocessor/controller 12 may cause this adaptive/predictive process to continue indefinitely. Thus, it should be understood that to help the adaptive/predictive routine described herein make future decisions, the microprocessor/controller 12 will take all the data and substantially simultaneously for each daily run time hour and learn and continue to monitor all the routines to effectively and efficiently optimize the usage of fuels and effectively and efficiently optimize the energy output of the system 10.

The following is an illustrative example of various data inputs into the microprocessor/controller 12. FIG. 3 illustrates an enlarged view of the controller display **12*a* on the microprocessor/controller 12 and the various data inputs 390 that are inputted by a technician, the customer or user into microprocessor/controller 12. The data 386 are initially programmed into the microprocessor/controller 12 using the keyboard 12*b* (FIG. 1). In the example being illustrated, note that the desired start time is six a.m. and an actual daily run time, which is the time that the system 10 will actually run, is initially set at eleven and one-half hours. This daily run time generally corresponds to the hours where the majority of the energy consumption by the customer or user will occur. The adaptive/predictive routine mentioned above relative to FIG. 7** may adapt and change this run time after start up and mentioned earlier.

The microprocessor controller 12 utilizes the data referred to in Table I and illustrated in FIG. 3 to automatically perform specified computations on a real time basis which is essential to the full functionality of system operation. As mentioned earlier herein, the majority of computations involve energy content in BTUs for the various fuels and/or gases that drive the engine 16 which converts combusted fuel into mechanical energy and thermal energy. FIG. 3 contains sample data used to operate a 53 kW cogeneration system on a continuous and indefinite basis in the following manner. Accordingly, the output of the alternator 18 desired is set at 53 kilowatts per hour which equates to approximately 180,836 BTUs. In general, if the system 10 determines that enough bio-fuel 84 is available to run using 100% of bio-fuel to generate 53 kilowatts per hour for the entire run time, then the microprocessor/controller 12 will cause the system 10 to run predominantly and exclusively on bio-fuel 84. As mentioned earlier herein, at start-up, the microprocessor/controller 12 causes the system 10 to run at 98% bio-fuel and 2% hydrogen, but it may be preferred that during normal operation, the system 10 is run on approximately 75% bio-fuel, 2% hydrogen and 23% natural gas, for example, assuming enough bio-fuel 84 is available. As also mentioned earlier, if the bio-fuel 84 drops below a predetermined level, then the microprocessor/controller 12 will automatically adjust the fuel mixture ratio so that it runs on less bio-fuel and utilizes more natural gas, propane gas and/or hydrogen.

Based upon the data obtained by the predictive/adaptive data routine (FIG. 7) and the demand run time, the first desired fuel mixture ratio to use in the engine 16 is 98% bio-fuel and 2% hydrogen, because the bio-fuel is less expensive and more environmentally friendly than using less bio-fuel and more, for example, diesel fuel. Again, this mixture ratio may be adjusted based on the run time hours and load demand that has been determined by the adaptive/predictive routine (FIG. 7) and the known availability of the bio-fuel. If based upon the actual or programmed data it is determined that an adequate level or supply of bio-fuel is available to run the engine 16 for the entire run time at a ratio of 98% bio-fuel 84 and 2% hydrogen, then the microprocessor/controller 12 will cause the system 10 to run at that ratio, and no natural gas or propane will be added to the mixture. As mentioned earlier, this ratio of bio-fuel to one or more of the other fuels will be changed depending on the availability and supply of the bio-fuel.

Returning to the illustration, if the maximum output of the alternator 18 is 53 kilowatts per hour and the volume of bio-fuel 84 used per hour at 100% usage of bio-fuel 84 is 5.09 gallons per hour, then the system 10 needs approximately 5.09 gallons per hour to generate a full desired output of 53 kilowatts per hour. This, of course, will change automatically as a customer's load decreases or increases up to the maximum of 53 kilowatts per hour.

The microprocessor/controller 12 starts by evaluating the available used bio-fuel 84 or oil data (Table 1 and FIG. 3) that is inputted into the microprocessor/controller 12 using keyboard **12*b* by the user or a technician in gallons. In the illustration shown in FIG. 3, the user has input 15 gallons of available bio-fuel 84 or oil. The microprocessor/controller 12 then determines or calculates if there is enough available bio-fuel 84 to run the system 10 at the mixture of 98% bio-fuel and 2% hydrogen for the entire inputted run time (11.5 hours in the example) or whether it needs to adjust the mixture ratio in accordance with the routine set forth in FIG. 8 described earlier herein. Note that in the illustration, the desired daily run time is eleven and one-half hours and because it takes approximately 5.09 gallons to run at 100% bio-fuel and there are only 15 gallons available, the microprocessor/controller 12 determines in the illustration that it cannot run with a mixture of 98%/2% hydrogen because it will run out of the bio-fuel 84 during the desired daily run. As mentioned earlier herein, the microprocessor/controller 12 will adjust the fuel mixture ratio into the engine 16 in accordance with the fuel mixture ratio routine in FIG. 8 so that the system 10 continuously uses bio-fuel 84 and so that the system 10 will run using a fuel mixture of bio-fuel 84, hydrogen and possibly natural or propane gas, but the mixture includes no less than 25% bio-fuel at any given time. As mentioned earlier herein, if there is no bio-fuel 84 available or not enough bio-fuel 84 available to run during the daily run time for a mixture having at least 25% bio-fuel 84, then the microprocessor/controller 12 will stop the system 10 and engine 16 and energize the switch 20 to cause the customer or user to obtain its electrical requirements from the utility grid 22 (FIG. 1**).

A general operation of the system 10 and the various components thereof (FIG. 1) will now be described. Once all initial start-up data (FIG. 3 & Table 1) has been inputted into the microprocessor/controller 12 and system 10 is powered, control panel screen **12*a* automatically displays that the system 10 is ready to start by user pressing the ON button. Once the ON button is pressed, system 10 (FIG. 2) starts up with the microprocessor/controller 12 controlling the operation based on the preprogrammed data (FIG. 3 & Table 1). The microprocessor/controller 12 then sends out sequential instructions to run various routines and processes to operate the system 10 (FIG. 2) depending upon the type of fuel being consumed. If the system 10 utilizes bio-fuel 84 as a fuel component, the first instruction initializes the recovery and refill process (FIG. 5) with recovery of waste cooking oil feedstock into tank 42 (FIG. 2). Once the upper float switch or sensor 48*b* in tank 42 energizes, signaling that enough feedstock or oil 44 is available, the microprocessor/controller 12 calls out to initialize the bio-fuel process (FIG. 6) described earlier, which generates or causes useable bio-fuel 84 for system 10 (FIG. 2) into tank 92**.

Next, the microprocessor initializes the energy control system and process (FIG. 4), which acquires and processes the data displayed on FIG. 4. This is the starting point for systems that operate on straight natural gas, propane, diesel fuel or gasoline, with the energy control system and process determining system operation. If bio-fuel is present, the energy control system data is used in an additional step when the microprocessor next initializes the fuel mixture routine (FIG. 8) described earlier. Once the system 10 has started up and the fuel mixture routine has determined that the system 10 is functioning correctly, fuel blend percentages are selected and activated for that day's desired run time. At this point, the microprocessor/controller 12 initializes the adaptive and predictive routine (FIG. 7) to maximize the efficiency of long term operation.

The microprocessor/controller 12 initializes the CHP processes, described earlier relative to FIG. 9, that had been preprogrammed in the start-up data (FIG. 3 and Table 1). All the aforementioned routines, processes and instructions are in a monitored and controlled bidirectional feedback loop with the microprocessor (12) which will continuously run the routines and processes as previously described in detail herein. If, at anytime, the user turns off the system 10 (e.g., for service procedures or others reasons), all the preprogrammed data and acquired data to that moment in time will be stored in the microprocessor/controller's 12 nonvolatile memory (not shown) and will be used above in the subsequent system start up.

Thus, it should be understood that once the microprocessor/controller 12 receives the inputted information and start up data (identified by reference numbers 386, 388 and 390 in FIG. 3), it initially runs the system 10 as mentioned earlier herein and then utilizes the adaptive/predictive routine (FIG. 7) to adjust the fuel mixture ratio as necessary to run the system 10 during the desired run time, which in the illustration is a eleven and one-half hour run time period. The microprocessor/controller 12 controls the system 10 and causes it to run for the desired eleven and one-half hours in the illustration using the initial inputted data, but again, it will adjust that mixture ratio depending on the actual usage, availability of bio-fuel, the learned load characteristics associated with the customer or user facility and the other sensed inputs and data. Again, the system 10 and the microprocessor/controller 12 makes future decisions and adjustments based upon the actual data, usage and sensed inputs and simultaneously adjust the fuel mixture ratio to effectively and efficiently optimize the energy output of the system 10.

Advantageously, the system and method described herein provide means for utilizing historical and adaptive logging while substantially simultaneously taking stored historical data and using the microprocessor/controller 12 to be adaptive, intuitive and predictive in computing and adjusting the fuel mixture ratio to effectively reduce the cost per kilowatt hour of electricity. By altering the blend of bio-fuel 84, hydrogen and natural gas or propane, the emissions from engine 16 can be controlled and even lowered compared to an engine 16 that runs on, for example, solely diesel fuel and/or natural gas. Conversely, if or when the fuel computation is such that because of demand and available fuel, the microprocessor/controller 12 determines that the utility grid 22 (FIG. 1) is better in terms of cost or efficiency, the system 10 will automatically reduce the cogeneration system 10 output until the feedstock or the bio-fuel is once again available. Additionally, inputted into the initial set up of the microprocessor/controller 12 may be a peak demand electrical usage curve for a particular customer facility that may be utilized until enough actual data can be determined for the adaptive/predictive mode or routine to set or change the load characteristics associated with that facility. Thus, by utilizing the system and method described herein, a net result of achieving a lower carbon emissions and a more efficient energy generation is provided.

Advantageously, the system and method also provide automated delivery of three distinct gases and/or fuels, the automatic blending, monitoring and controlling of these mixtures to provide a super fuel to be used to reduce dependency on petroleum-based fuels while reducing a customer's carbon footprint. The system and method provide an adaptive and/or predictive process for improving energy efficiencies and using waste heat generated from the engine 16, such as in the combined heat and power (CHP) systems illustrated in FIG. 9. As mentioned earlier herein, such CHP systems may include at least one or a plurality of absorption chillers, deep fryers, boiler, generators, or even consumer devices, such as a pool, spa and the like. It has been found that this also increases the efficiency of the system 10 by converting the thermal energy generated from the engine 16 into various other processes that utilize the normally wasted heat energy to drive the aforementioned absorption chiller, a heating coil of a boiler, the heating of cooking oil in a deep fryer or other devices.

Advantageously, the system and method provide means and apparatus for automatically blending fuels while simultaneously converting water to hydrogen, converting waste oils to bio-fuel suitable for combustion and then combining them in a controlled mixture or ratio with hydrogen, natural gas and/or propane as necessary in order to improve the energy efficiency of the system 10 and reduce emissions generated by the engine 16.

Advantageously, this system and method provides a power system for supplementing power from a power grid, using bio-fuels. The system and method are particularly adapted for use in a setting that generates waste oil (e.g., waste cooking oil) such as in a restaurant. The system is particularly adapted for installation and use in a restaurant such as a fast food restaurant. Thus, one advantage of the system 10 is that it can be installed and used on site and directly at the user's facility.

While the system, apparatus, method and processes described constitute preferred embodiments of this invention, it is to be understood that the invention is not limited to this precise apparatus and method, and that changes may be made in either without departing from the scope of the invention, which is defined in the appended claims.

Advantageously, the system 10 and method provides many advantages, some of which include:

A system or method that utilizes an adaptive predictive energy routine to automatically adjust multiple fuels and/or gases, including but not limited to: NG, LP, diesel, bio-fuel and hydrogen creating a super fuel used in various type of combustion processes such as but not limited to, internal combustion engines or turbine engines to improve the overall mechanical and thermal outputs of these combustion processes and greatly improve the energy derived from such fuels.

A system or method that utilizes an adaptive predictive energy routine to automatically adjust multiple fuels and/or gases, including but not limited to: NG, LP, diesel, bio-fuel and hydrogen creating a super fuel used in various type of combustion processes such as but not limited to, internal combustion engines and/or turbine engines to reduce the emissions i.e. CO2, CO or NOx and carbon foot print associated with such fuels and combustion processes.

A system or method that automatically removes and refills new or use waste cooking oils from conventional fryers and further used in production of onsite bio-fuels A system or method that utilizes waste heat from CHP/cogeneration processes to heat said fry oil to increase the overall efficiencies of fryer and reduce the normal energy consumption required via electric heat or gas heating of said fryers.

A system or method that automatically utilizes waste heat from CHP process to use the waste heat thru a heat exchange process to reduce the viscosity of diesel, bio-fuel or various motor fuels prior to combustion.

A system or method of utilizing and adaptive predictive energy routine to improve overall efficiencies of CHP system.

A system or method to automatically extract fry oils from conventional fryers and automatically convert on site into useful bio-fuel with limited waste.

A system or method to improve energy output from various combustion processes and or IC engines, or turbine engines utilizing an adaptive predictive energy routine to optimize the thorough and complete utilization of energy content of various fuels during combustion processes to increase the overall performance and mechanical output or useful horse power in these types of combustion processes thereby improving overall efficiencies.

We claim:

1. An automated mixing system for providing a fuel mixture for use by an engine that drives a generator or alternator, comprising:

a gas supply for providing at least one of natural gas, propane or hydrogen;

a bio-fuel supply for providing a bio-fuel;

a plurality of valves for controlling a mixture and delivery of said gas supply and said bio-fuel in a predetermined fuel ratio to said engine; and a processor coupled to said plurality of valves and causing said plurality of valves to generate the fuel mixture of said bio-fuel and said at least one of natural gas, propane or hydrogen from said bio-fuel supply and said gas supply, respectively;

at least one sensor for sensing an amount of electrical energy consumed at a location during a period of time, said location being a location that uses electricity;

said processor further comprising an adaptive routine using said sensed amount of electrical energy consumed during said period of time and determining an amount of energy needed at said location for a current or future period of time;

said processor adapting said predetermined fuel ratio in response to said determination of said amount of electrical energy needed at said location for said current or future period and an amount of available bio-fuel from said bio-fuel supply.

2. The automated mixing system as recited in claim 1 wherein said system comprises an adaptive routine for tracking historical data regarding energy consumption at a location, said processor predicting future energy consumption and adapting said predetermined fuel ratio in response thereto.

3. The automated mixing system as recited in claim 2 wherein said processor determines at least one of a cumulative hour-by-hour average energy consumption or a cumulative day-by-day average energy consumption, said processor predicting energy consumption at said location in response to said at least one of a cumulative hour-by-hour average energy consumption or said cumulative day-by-day average energy consumption and adapting said predetermined fuel ratio in response thereto.

4. The automated mixing system as recited in claim 3 wherein said processor also adapting said predetermined fuel ratio in response to an amount of bio-fuel available from said bio-fuel supply.

5. The automated mixing system as recited in claim 1 wherein said system comprises an adaptive routine for tracking historical data regarding energy consumption at a location, said processor predicting future energy consumption and adapting said predetermined fuel ratio in response thereto.

6. The automated mixing system as recited in claim 1 wherein said system further comprises:

an emission sensor associated with an exhaust of said engine, said emission sensor sensing an emission of at least one of CO2, CO or NOx gases and generating a sensed emission signal in response thereto;

said processor being coupled to said emission sensor and adjusting said predetermined fuel ratio in response to said sensed emission signal.

7. The automated mixing system as recited in claim 1 wherein said system further comprises:

an emission sensor associated with an exhaust of said engine, said emission sensor sensing an emission of at least one of CO2, CO or NOx gases and generating a sensed emission signal in response thereto;

said processor receiving both said energy consumption signal and said sensed emission signal and adjusting said predetermined fuel ratio in response thereto in order to reduce said emissions.

8. The automated mixing system as recited in claim 1 wherein said processor changes said predetermined fuel ratio in response to a quantity of said bio-fuel supply available.

9. The automated mixing system as recited in claim 8 wherein said processor comprises an adaptive routine for tracking historical data regarding energy consumption at a location;

said processor increasing an amount of said bio-fuel in said predetermined fuel ratio in response to a relative cost of power to be demanded from a power grid using historical data of power usage at said location.

10. The automated mixing system as recited in claim 8 wherein said processor decreases an amount of said bio-fuel in said predetermined fuel ratio if a demand for power at a location is low based upon historical data of power usage at said location.

11. The automated mixing system as recited in claim 1 wherein said system comprises an adaptive routine for tracking historical data regarding energy consumption at a location;

said processor changes said predetermined fuel ratio in a response to a cost of power from a power grid.

12. The automated mixing system as recited in claim 1 wherein said bio-fuel is used cooking oil.

13. The automated mixing system as recited in claim 12 wherein said bio-fuel comprises an additive.

14. The automated mixing system as recited in claim 1 wherein said predetermined fuel ratio is approximately at least 25% bio-fuel, with a majority of a remaining predetermined fuel ratio being natural gas or propane and a minority of said remaining predetermined fuel ratio being hydrogen when bio-fuel from said bio-fuel supply is available and a demand for power at a location is above a predetermined demand.

15. The automated mixing system as recited in claim 14 wherein said predetermined demand is a high demand as determined by said processor based upon historical data.

16. The automated mixing system as recited in claim 15 wherein said predetermined fuel ratio is approximately at least 75% bio-fuel, with a majority of a remaining portion of said predetermined fuel ratio being natural gas or propane and a minority of said remaining portion of said predetermined fuel ratio being hydrogen.

17. The automated mixing system as recited in claim 1 wherein said predetermined fuel ratio is approximately at least 73% natural gas or propane, with a majority of a remaining predetermined fuel ratio being bio-fuel and a minority of said remaining predetermined fuel ratio being hydrogen when either bio-fuel from said bio-fuel supply is below a predetermined bio-fuel supply amount or a demand for power at a location is below a predetermined demand.

18. The automated mixing system as recited in claim 17 wherein said processor adjusts said predetermined fuel ratio will have at least some percentage of bio-fuel for use by said engine.

19. The automated mixing system as recited in claim 17 wherein said processor adjusts said predetermined fuel ratio will have no amount of bio-fuel if said processor determines that enough bio-fuel is not available for an entire run cycle or time at a customer facility.

20. The automated mixing system as recited in claim 17 wherein said predetermined demand is a low demand as determined by said processor based upon historical data.

21. The automated mixing system as recited in claim 17 wherein said predetermined fuel ratio is approximately at least 75% natural gas or propane, with a majority of a remaining portion of said predetermined fuel ratio being bio-fuel and a minority of said remaining portion of said predetermined fuel ratio being hydrogen.

22. The automated mixing system as recited in claim 1 wherein said engine is coupled to an alternator, said processor starts said engine to provide electricity to a location when a load peak demand at said location is high, said processor determining said predetermined fuel ratio and controlling said plurality of valves to adapt said mixture of said bio-fuel, natural gas or propane and hydrogen used by said engine in response to said load peak demand.

23. The automated mixing system as recited in claim 22 wherein said processor is coupled to a power grid, said processor controlling an amount of power to be used from said power grid with an amount of electricity provided by said alternator when said load peak demand is high.

24. The automated mixing system as recited in claim 1 wherein said gas supply comprises an electrolyzer for generating said hydrogen from water.

25. The automated mixing system as recited in claim 1 wherein said processor adjusts said predetermined fuel ratio based upon at least one of an amount of emissions of said engine, a temperature of said engine, an amount of power available from a power grid, or an amount of said bio-fuel in said bio-fuel supply and available for consumption by said engine.

26. The automated mixing system as recited in claim 1 wherein said engine is an internal combustion engine.

27. The automated mixing system as recited in claim 1 wherein said engine is a turbine engine.

28. The automated mixing system as recited in claim 18 wherein said processor calculates an amount of hours it can run the engine using all available bio-fuel and adjusts the predetermined fuel ratio to compensate for any deficiency so that said system uses 100% of the bio-fuel from said bio-fuel supply.

29. The automated mixing system as recited in claim 1 wherein said processor generates said predetermined fuel ratio of between 25%-100% bio-fuel, 0-2% hydrogen, and 0-75% natural gas or propane.

30. The automated mixing system as recited in claim 29 wherein said processor adjusts the bio-fuel percentage in said predetermined fuel ratio based upon at least one of an available amount of said bio-fuel in said bio-fuel supply or an actual run-time schedule that the engine will run at a location.

31. The automated mixing system as recited in claim 30 wherein said processor adapts the bio-fuel percentage in said predetermined fuel ratio to an equivalent amount of bio-fuel used during each run-time hour of said actual run-time schedule.

32. The automated mixing system as recited in claim 24 wherein said automated mixing system is situated at a location that comprises at least one deep fryer, said automated mixing system further comprising a refill system coupled to said at least one deep fryer for removing used cooking oil from said at least one deep fryer and replacing it with unused oil.

33. The automated mixing system as recited in claim 32 wherein said system further comprises a pump for pumping said used cooking oil into said bio-fuel supply to provide said bio-fuel in said bio-fuel supply.

34. The automated mixing system as recited in claim 1 wherein the automated mixing system is situated at an end user location.

35. The automated mixing system as recited in claim 34 wherein, said system further comprising a combined heat and power system associated with said engine to utilize waste heat from said engine.

36. The automated mixing system as recited in claim 1 wherein said automated mixing system further comprises:

a first supply tank of used oil and a plurality of filters situated at an end-user location;

said plurality of filters filtering said used oil from said first supply tank to provide said bio-fuel so that it can be mixed with at least one of said natural gas, propane or hydrogen.

37. The automated mixing system as recited in claim 36 wherein the said first supply tank comprises at least one deep fryer and said end-user location is a restaurant.

38. The automated mixing system as recited in claim 1 wherein said automated mixing system further comprising:

an automatic refiller for removing used cooking oil from at least one deep fryer at a location and for automatically refilling said at least one deep fryer with unused cooking oil.

* * * * *